(12) United States Patent
Thimmaiah et al.

(10) Patent No.: US 11,127,032 B2
(45) Date of Patent: Sep. 21, 2021

(54) OPTIMIZING AND PREDICTING CAMPAIGN ATTRIBUTES

(71) Applicant: ToneDen, Inc., Los Angeles, CA (US)

(72) Inventors: Tim Thimmaiah, Los Angeles, CA (US); Nick Elsbree, Los Angeles, CA (US); Jake Rush, Los Angeles, CA (US)

(73) Assignee: EVENTBRITE, INC., San Francisco, CA (US)

( * ) Notice: Subject to any disclaimer, the term of this patent is extended or adjusted under 35 U.S.C. 154(b) by 366 days.

(21) Appl. No.: 16/194,973

(22) Filed: Nov. 19, 2018

(65) Prior Publication Data

US 2020/0160373 A1 May 21, 2020

(51) Int. Cl.
*G06Q 30/00* (2012.01)
*G06Q 30/02* (2012.01)
*G06N 20/00* (2019.01)

(52) U.S. Cl.
CPC ......... *G06Q 30/0244* (2013.01); *G06N 20/00* (2019.01); *G06Q 30/0246* (2013.01); *G06Q 30/0269* (2013.01); *G06Q 30/0249* (2013.01)

(58) Field of Classification Search
CPC .............. G06Q 30/0207–0277; G06N 20/00
See application file for complete search history.

(56) References Cited

U.S. PATENT DOCUMENTS 8,762,193 B2 * 6/2014 Maga ............... G06Q 30/02
705/7.31

10,019,731 B1 * 7/2018 Wu ................. G06Q 30/0246
10,104,172 B1 * 10/2018 Demsey ............. H04L 67/289
10,796,337 B2 * 10/2020 Wee ................ G06Q 30/0254

(Continued)

OTHER PUBLICATIONS

Chen, Ye et al. "Real-Time Bidding Algorithms for Performance-Based Display Ad Allocation." ACM: KDD 2011, Aug. 21-24, 2011. (Year: 2011).*

(Continued)

*Primary Examiner* — Luis A Brown
(74) *Attorney, Agent, or Firm* — Platinum Intellectual Property LLP

(57) ABSTRACT

Approaches provide for or automatically optimizing sponsored content campaigns for a sponsored content provider for a particular consumption category across different content publisher networks. For example, performance data for sponsored content campaigns can be used to train a model for a consumption category to determine allocation scores that quantify a relationship between target audiences and the consumption category. In response to a content placement request to initiate a sponsored content campaign associated with the consumption category, allocation scores can be determined and used to dynamically determine an allocation of resources to appropriate audiences or segments based at least in part upon the trained optimization model. A campaign template can be generated that includes the target audience(s), sponsored content, and respective budget allocation, and any other information for the campaign. The campaign can proceed based at least in part on the campaign template, and performance of the campaign can be monitored and analyzed during the campaign to optimize the campaign dynamically.

18 Claims, 11 Drawing Sheets

(56) References Cited

U.S. PATENT DOCUMENTS

| | | | | |
|---|---|---|---|---|
| 10,853,845 B2* | 12/2020 | Herkert | ............ | G06Q 30/0221 |
| 10,902,438 B2* | 1/2021 | Matsuo | ............ | G06Q 30/0224 |
| 11,042,886 B2* | 6/2021 | Roetter | ............ | G06Q 30/0243 |
| 2002/0026327 A1* | 2/2002 | Kothari | ................ | G06F 21/10 |
| | | | | 715/273 |
| 2008/0306820 A1* | 12/2008 | Passmore | .......... | G06Q 30/0269 |
| | | | | 705/14.53 |
| 2009/0063268 A1* | 3/2009 | Burgess | ............ | G06Q 30/0204 |
| | | | | 705/14.39 |
| 2011/0015987 A1* | 1/2011 | Chakraborty | ......... | G06Q 30/02 |
| | | | | 705/14.39 |
| 2011/0125573 A1* | 5/2011 | Yonezaki | ............ | G06Q 30/0242 |
| | | | | 705/14.48 |
| 2012/0089455 A1* | 4/2012 | Belani | ............ | G06Q 30/0245 |
| | | | | 705/14.44 |
| 2013/0124298 A1* | 5/2013 | Li | ................ | G06Q 30/0241 |
| | | | | 705/14.42 |
| 2014/0108531 A1* | 4/2014 | Klau | ............... | H04N 21/2743 |
| | | | | 709/204 |
| 2014/0278927 A1* | 9/2014 | Close | ............... | G06Q 30/0246 |
| | | | | 705/14.45 |
| 2015/0242906 A1* | 8/2015 | Liu | ................... | G06Q 30/0277 |
| | | | | 705/14.71 |
| 2016/0019213 A1* | 1/2016 | Carmel | ................ | G06F 16/951 |
| | | | | 707/728 |
| 2016/0019572 A1* | 1/2016 | Ekselius | ............ | G06Q 30/0211 |
| | | | | 705/14.13 |
| 2016/0019581 A1* | 1/2016 | Wu | ................... | G06Q 30/0269 |
| | | | | 705/14.43 |
| 2016/0019595 A1* | 1/2016 | Wu | ................... | G06Q 30/0218 |
| | | | | 705/14.66 |
| 2016/0203338 A1* | 7/2016 | Dabbiru | ............. | G06F 16/2365 |
| | | | | 707/687 |
| 2016/0212178 A1* | 7/2016 | Zhang | ................ | H04L 65/1066 |
| 2016/0225014 A1* | 8/2016 | Mitra | ................ | G06Q 30/0243 |
| 2016/0267527 A1* | 9/2016 | Flood | ................ | G06Q 30/0246 |
| 2016/0285672 A1* | 9/2016 | Huang | ................ | H04L 41/042 |
| 2017/0178197 A1* | 6/2017 | Hong | ................ | G06Q 30/0277 |
| 2018/0096410 A1* | 4/2018 | Zhao | ................ | G06Q 30/0643 |
| 2018/0189074 A1* | 7/2018 | Kulkarni | ............... | G06Q 30/02 |
| 2018/0268073 A1* | 9/2018 | Wang | ..................... | H04L 67/22 |
| 2018/0349944 A1* | 12/2018 | Masson | ............. | G06Q 30/0244 |
| 2019/0130436 A1* | 5/2019 | Ma | ..................... | G06Q 30/0244 |
| 2019/0164082 A1* | 5/2019 | Wu | ....................... | G06Q 50/01 |
| 2019/0182059 A1* | 6/2019 | Abdou | ................... | H04L 12/18 |
| 2019/0342595 A1* | 11/2019 | Ramani | ............. | G06Q 30/0251 |
| 2020/0160373 A1* | 5/2020 | Thimmaiah | ........ | G06Q 30/0244 |

OTHER PUBLICATIONS

Chou, ,Paul et al., "Identifying Prospective Customers." ACM: University of California Riverside, KDD 2000. (Year: 2000).*

* cited by examiner

OPTIMIZING AND PREDICTING CAMPAIGN ATTRIBUTES

BACKGROUND

As the number of users electronically viewing information and purchasing items increases, there is a corresponding increase in the amount of sponsored content (e.g., advertisements, media, content elements, etc.) revenue spent in electronic environments. In conventional approaches, a sponsored content provider such as an advertiser might select an audience in which to provide content for a particular item of interest (e.g., a product, an event, a service, etc.) Such an approach requires the sponsored content provider to know the appropriate audience for which to target sponsored content which includes a representation of the item of interest. In many cases, the audience selection may not be optimal or may include many users who will not be interested in the sponsored content.

For example, a user viewing a page of content relating to t-shirts may be associated with a t-shirt category and thus may receive content relating to t-shirts. In many cases, however, the user may have been looking for something only tangentially related to t-shirts or might have only visited a clothing page once for a particular reason. Thus, conventional approaches do not optimally reflect the interests of various users and do not allow sponsored content providers to determine the appropriate users quickly, or categories of users, to target. Further, whether content is targeted to an appropriate audience can be difficult or impossible to determine initially. Consequently, performance is often inadequate for initial sponsored content campaigns and sponsored content providers fail to create subsequent campaigns. In the situation sponsored content providers proceed with subsequent campaigns, significant time and resources are typically used before desired results can be obtained. For example, management of a campaign may involve changing the campaign by removing sponsored content that is ineffective, creating new sponsored content, and/or dedicating more resources to sponsored content that has proven to be effective. Management may involve monitoring campaign performance and adjusting the campaign accordingly. This process may take significant time and resources and, because of the uncertainty, subjectivity, and complexity of providing relevant content, this process may not lead to desired results.

SUMMARY

This summary is provided to introduce a selection of concepts in a simplified form that are further described below in the Detailed Description. This summary is not meant or intended to identify or exclude critical features or essential features of the claimed subject matter, nor is it intended to be used as an aid in determining the scope of the claimed subject matter.

In one aspect, embodiments relate to a computing system that includes at least one computing device processor, wherein the at least one computing device processor enables the computing system to obtain historical performance data during a first period of time from a plurality of electronic sponsored content providers offering sponsored content in electronic environments, the historical performance data associated with sponsored content campaigns for a consumption category, train an optimization model on the historical performance data to generate a trained optimization model for the consumption category, the trained optimization model operable to determine, for a sponsored content campaign associated with the consumption category, an allocation score quantifying a relationship between at least one target audience including one or more users and the consumption category, receive a content placement request during a second period of time from a sponsored content provider to initiate a sponsored content campaign, the content placement request including information for at least the consumption category, a commitment amount, and sponsored content elements, the second period of time occurring after the first period of time, a sponsored content element including information for at least one item for consumption associated with the consumption category, determine a set of target audiences based at least in part on the content placement request and the historical performance data, use the trained optimization model and information associated with the content placement request to determine allocation scores for the set of target audiences, provide computer-readable instructions to a content publisher to allocate the commitment amount to the set of target audiences based at least in part on the allocation scores, and update, based at least in part on performance data associated with the sponsored content campaign, the trained optimization model to generate an updated trained optimization model.

In some embodiments, the instructions, when executed by the computing device processor to receive a subsequent content placement request from a subsequent content provider for a subsequent sponsored content campaign, the subsequent content placement request associated with the consumption category, and utilize the updated trained optimization model in the subsequent sponsored content campaign.

In some embodiments, the instructions, when executed by the computing device processor to train the optimization model, further enables the computing system to use the updated trained optimization model to generate updated allocation scores, and allocate at least a portion of a remaining amount of the commitment amount based at least in part on the updated allocation scores.

In some embodiments, the instructions, when executed by the computing device processor further enables the computing system to analyze the performance data to identify a plurality of conversion events, a conversion event associated with a conversion event type, determine a total number of conversion events for individual conversion event types, and normalize the total number of conversion events for individual conversion event types to a total number of conversion events for a reference conversion event type, the reference conversion event type being selected by the sponsored content provider, wherein a value of a normalized conversion event corresponds to a weight for the conversion event, the weight for the conversion event quantifying a level of importance of the conversion event in an advertising campaign.

In some embodiments, the instructions, when executed by the computing device processor further enables the computing system to, for individual target audiences, multiply individual conversion events by a corresponding weight to determine a set of conversion scores, determine a summation of the set of conversion scores, and divide the summation of the set of conversion scores by a total commitment amount to determine a performance parameter for the advertising campaign, individual total commitment values associated with a respective target audience, wherein the performance parameter quantifies a likelihood of a conversion event to occur.

In some embodiments, the instructions, when executed by the computing device processor further enables the computing system to use a ranking technique to a rank a set of content elements, individual content elements including information for the at least one item for consumption for use in an advertising campaign, provide for display the ranked set of content elements, and enable an advertiser to select at least one content element from the ranked set of content elements for use in the advertising campaign.

In another aspect, embodiments relate to a computing system that includes at least one computing device processor, wherein the at least one computing device processor enables the computing system to receive a content placement request for a media campaign from a media provider, the content placement request associated with at least a consumption category and a commitment amount, determine, based at least in part on historical performance data for media campaigns associated with the consumption category and the content placement request, a plurality of target audiences for the media campaign, use a trained optimization model to determine a set of allocation scores for the plurality of target audiences, an allocation score quantifying a relationship between at least one target audience and the consumption category, generate computer-readable instructions to allocate the commitment amount to the plurality of target audiences based at least in part on the set of allocation scores, and update, based at least in part on performance data associated with the media campaign, the trained optimization model to generate an updated trained optimization module, the updated trained optimization model configured to update the set of allocation scores.

In some embodiments, the instructions, when executed by the computing device processor, further enables the computing system to receive a subsequent content placement request from a subsequent media provider for a subsequent media campaign, the subsequent content placement request associated with the consumption category, and utilize the updated trained optimization model in the subsequent media campaign.

In some embodiments a catalog of consumption categories includes the consumption category, the consumption category associated with one of a good or service.

In some embodiments, the instructions, when executed by the computing device processor, further enables the computing system to analyze the performance data to identify a plurality of conversion events, determine an estimate of a potential return on investment for a media campaign budget based at least in part on the plurality of conversion events, determine the estimate satisfies a threshold amount, and adjust the media campaign budget in accordance with the estimate.

In some embodiments, the instructions, when executed by the computing device processor further enables the computing system to analyze the performance data to identify a plurality of conversion events, determine an estimate of a return on investment for the media campaign based at least in part on the plurality of conversion events, determine the estimate fails to satisfy a threshold amount, and update the trained optimization model.

In some embodiments the instructions, when executed by the computing device processor further enables the computing system to monitor a value of at least one performance parameter during performance of the media campaign, and determine whether the value satisfies a threshold value to a determined deviation, and automatically update the trained optimization model based at least in part on the value.

In some embodiments, a content publisher includes at least one social media network, and wherein the media provider includes at least one advertising entity.

In some embodiments the instructions, when executed by the computing device processor further enables the computing system to use at least one ranking technique to a rank a set of content elements, and enable an advertiser to select one of the content elements from a ranked set of content elements for use in the media campaign.

In some embodiments the instructions, when executed by the computing device processor further enables the computing system to obtain the historical performance data for the media campaigns associated with the consumption category and the content placement request from a plurality of electronic sponsored content providers, and train an optimization model on the historical performance data to generate the trained optimization model for the consumption category, the trained optimization model operable to determine, based at least in part the consumption category, the set of allocation scores.

In some embodiments the instructions, when executed by the computing device processor further enables the computing system to associate the media campaign with a first set of tags that characterize the media campaign, and identify a subsequent media campaign associated with a second set of tags that match the first set of tags by a threshold amount of deviation, use information associated with the media campaign to set up the subsequent media campaign.

In some embodiments the first set of tags identify one of the consumption category, the plurality of target audiences, or the performance data.

In yet another aspect, embodiments relate to a computer-implemented method that includes receiving a content placement request for a media campaign from a media provider, the content placement request associated with at least a consumption category and a commitment amount, determining, based at least in part on historical performance data for media campaigns associated with the consumption category and the content placement request, a plurality of target audiences for the media campaign, using a trained optimization model to determine a set of allocation scores for the plurality of target audiences, an allocation score quantifying a relationship between at least one target audience and the consumption category, generating computer-readable instructions to allocate the commitment amount to the plurality of target audiences based at least in part on the set of allocation scores, and updating, based at least in part on performance data associated with the media campaign, the trained optimization model to generate an updated trained optimization module, the updated trained optimization model configured to update the set of allocation scores.

In some embodiments, the method further includes receiving a subsequent content placement request from a subsequent media provider for a subsequent media campaign, the subsequent content placement request associated with the consumption category, and utilizing the updated trained optimization model in the subsequent media campaign.

In some embodiments, a catalog of consumption categories includes the consumption category, the consumption category associated with one of a good or service.

BRIEF DESCRIPTION OF THE DRAWINGS

Various embodiments in accordance with the present disclosure will be described with reference to the drawings, in which.

DETAILED DESCRIPTION

Figure 1A:
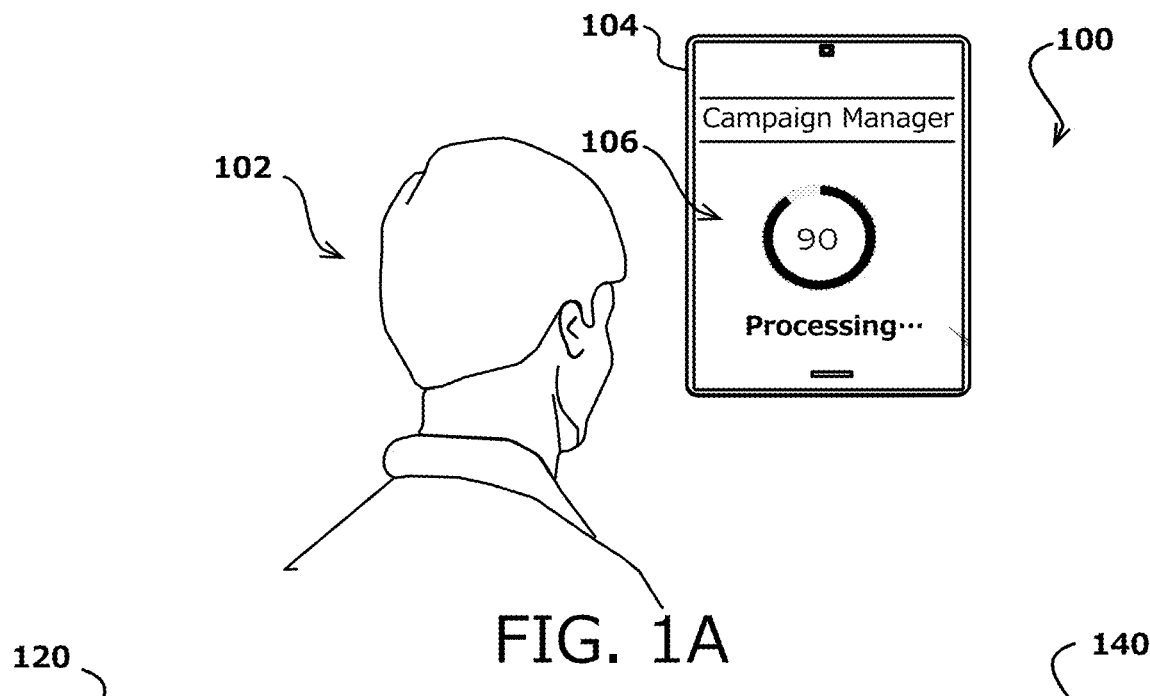
FIGS. 1A, 1B, and 1C illustrate an example situation of enabling a customer to initiate a campaign in accordance with various embodiments.

Systems and methods in accordance with various embodiments of the present disclosure may overcome one or more of the aforementioned and other deficiencies experienced in conventional approaches to managing electronic content campaigns. In particular, various embodiments describe systems and methods for automatically optimizing sponsored content campaigns or other media campaigns for a sponsored content provider (e.g., an advertiser, a media provider, a content provider, etc.) for a particular consumption category across different content publisher networks such as social media networks, electronic marketplaces, search engines, and other content publisher networks by obtaining and utilizing performance data from other campaigns promoting goods and/or services for the same consumption category. When a new campaign for the same consumption category is initiated for the same or different sponsored content provider, the performance data for past campaigns for the consumption category can be utilized to optimize the new campaign.

In accordance with an embodiment, performance data (e.g., data on conversion events) for past sponsored content campaigns can be used to train an optimization model to generate a trained optimization model. The performance data can be obtained from sponsored content providers (e.g., advertisers) who provide sponsored content or otherwise advertise with one or more content publishers for a consumption category, including, for example, a telecommunications consumption category, a travel consumption category, an apparel consumption category, etc. The trained optimization model can be optimized for the consumption category by using the performance or other campaign data associated with the consumption category. The trained optimization model can then be utilized to determine allocation scores that quantify a relationship between at least one target audience (e.g., a group of users on a publisher's website) associated with the consumption category. The allocation scores or other such information can be used to determine information for the campaign such as an allocation of resources to appropriate audiences or segments. Thereafter, the campaign can be launched in accordance with this information. In various embodiments, when a new sponsored content campaign for the same consumption category is initiated for the same or different sponsored content provider, the current trained optimization model for the consumption category can be utilized to determine the optimal target audience, sponsored content, and determine one or more target audiences and appropriate allocation scores.

For example, in response to a content placement request, such as an ad campaign request or other such request, to initiate a sponsored content campaign associated with the consumption category, allocation scores can be determined and used to dynamically determine an allocation of resources to appropriate audiences or segments based at least in part upon the trained optimization model. A campaign template can be generated that includes the target audience(s), sponsored content, and respective budget allocation, and any other information for the campaign. Thereafter, the campaign can proceed based at least in part on the campaign template. For example, the campaign budget can be automatically allocated across target audiences, and the sponsored content can be sent to the appropriate content publisher to be displayed by the content publisher when keywords or other events occur at the content publisher website.

Performance of the campaign can be monitored and analyzed during the campaign to optimize the campaign dynamically. Optimizing the campaign can include, for example, updating the trained optimization model to adjust the allocation of resources across audiences dynamically. For instance, if the initial audience does not result in a positive return on investment (or if a better return on investment is predicted if more money is spent on another audience), money in the budget may be reallocated to audiences expected to perform better, e.g., regarding return on investment. In at least some embodiments, suggestions can be made to help the sponsored content provider to determine the appropriate audience and/or to automatically allocate the commitment value among target audiences across different content publisher networks, where advertising space on a content publisher network may be purchased in accordance with the allocation scores.

Instructions for causing a computer system to perform automated campaign management in accordance with the present disclosure may be embodied on a computer-readable medium. Further, in accordance with various embodiments, a system for providing automated campaign management is provided. For example, in accordance with an embodiment, a backend system may automatically optimize sponsored content campaigns for a sponsored content provider for a particular consumption category across different content publisher networks by obtaining and utilizing performance data from other campaigns promoting goods and/or services for the same consumption category. In various embodiments, the system can, utilize optimized models from past campaigns associated with a consumption category for a new campaign associated with the same consumption category.

Embodiments provide a variety of advantages. For example, in accordance with various embodiments, dynamic campaign management can be utilized by any system that attempts to optimize resource usage including computing system resources and financial resources. These systems can include, for example, social networks, airline booking platforms, consumer bidding platforms, accommodation booking platforms, and other electronic environments that enable users to purchase and/or rent items of interest. In accordance with various embodiments, by providing a system that enables users to optimize their content campaign, the system can more efficiently and quickly launch targeted campaigns. For example, as described, whether content is targeted to an appropriate audience can be difficult or impossible to determine initially. Consequently, performance is often poor for initial sponsored content campaigns and sponsored content providers fail to create subsequent campaigns. In the situation sponsored content providers proceed with subsequent campaigns, significant time and resources are typically used before desired results can be obtained. In accordance with various embodiments, approaches described herein advantageously provide for automatically optimizing sponsored content campaigns for a sponsored content provider for a particular consumption category across different content publisher networks by obtaining and utilizing performance data from other campaigns promoting goods and/or services for the same consumption category. Accordingly, additional efficient and cost conscience interactions can be accomplished.

Various other functions and advantages are described and suggested below as may be provided in accordance with the various embodiments.

Figures 1B, 1C:
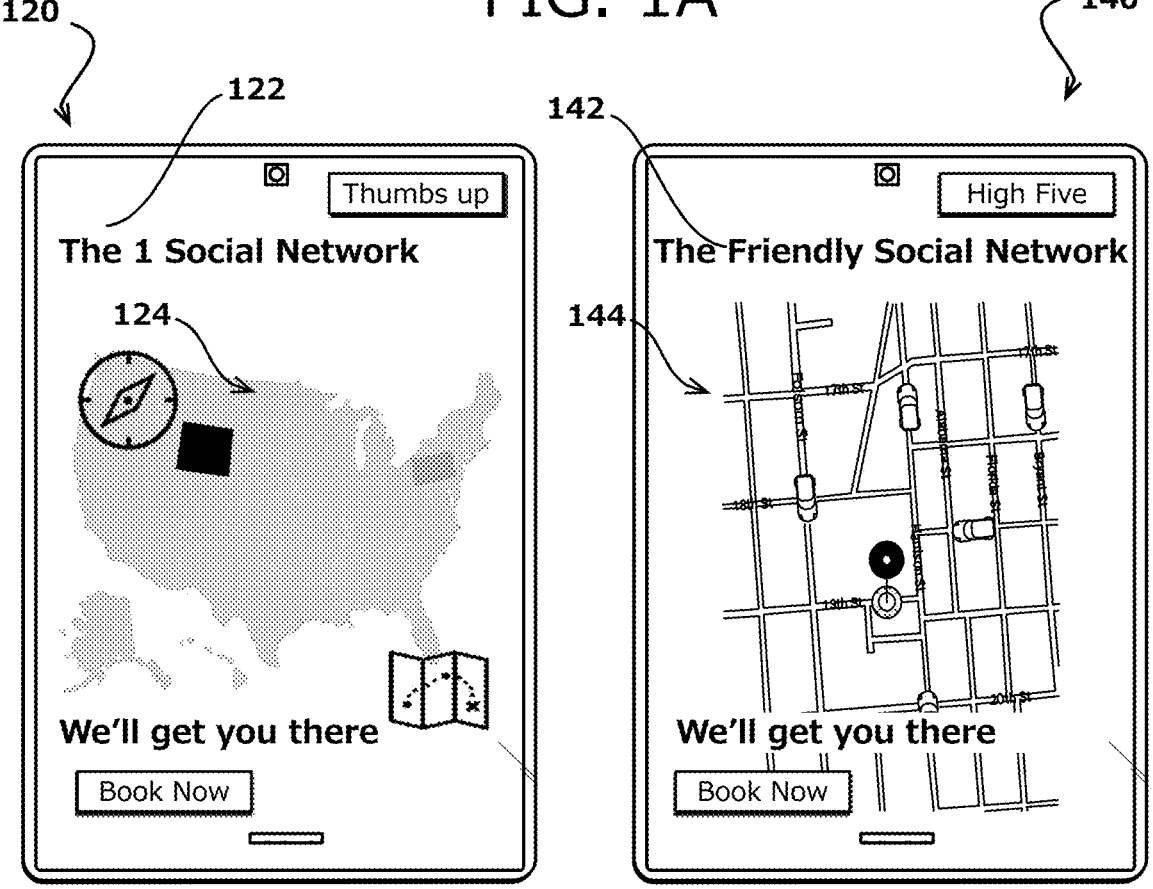

FIGS. 1A, 1B, and 1C illustrate an example situation in which a user 102 can initiate a campaign in accordance with various embodiments. As shown in example 100 of FIG. 1A, a user 102 can use campaign manager 106 to submit a content placement request, such as a sponsored campaign or ad campaign request, using portable computing device 104. Although a portable computing device (e.g., a smartphone, an e-book reader, or tablet computer) is shown, it should be understood that various other types of electronic devices which are capable of displaying content can be used in accordance with various embodiments discussed herein. These devices can include, for example, desktop computers, notebook computers, personal data assistants, video gaming consoles or controllers, wearable computers (e.g., a smartwatch or glasses), and portable media players, smartphones, among others.

The content placement request can be received at a campaign optimization system or other such campaign management system associated with a sponsored content provider (e.g., advertiser, media provider, etc.) The content placement request can include a number of campaign attributes. The campaign attributes can include information for a consumption category, a campaign budget or commitment amount, a campaign duration, suggested target audiences, a campaign objective, sponsored content such as advertising content, etc. The campaign optimization system can optimize sponsored content campaigns for a sponsored content provider for a particular consumption category across different content publisher networks by obtaining and utilizing performance data from other campaigns promoting goods and/or services for the same consumption category.

For example, as shown in example 120 of FIG. 1B, in response to the content placement request, sponsored content element 124 is presented on a website associated with content publisher 122, in this example, a social media website. The sponsored content element can be an advertisement for goods and/or services. The sponsored content element can be associated with a sponsored content provider, such as an advertiser, media provider, etc. The sponsored content provider in some embodiments can be an advertiser, merchant or some other entity, or a combination of entities. Performance of the campaign can be monitored and analyzed during the campaign to optimize the campaign dynamically. Optimizing the campaign can include, for example, updating the trained optimization model to adjust the allocation of resources across audiences dynamically. For instance, if the initial audience does not result in a positive return on investment (or if a better return on investment is predicted if more money is spent on another audience), money in the budget may be reallocated to audiences expected to perform better in terms of return on investment. Additionally, or alternatively, a different content element can be automatically selected (and in some embodiments in response to a user-provided input) for a particular audience to optimize a return on investment.

In accordance with various embodiments, when a new sponsored content campaign for the same consumption category is initiated for the same or different sponsored content provider, the current trained optimization model for the consumption category can be utilized to determine the optimal target audience, sponsored content, one or more target audiences, and appropriate allocation scores for those audiences. For instance, in example 140 of FIG. 1C, a new sponsored content campaign for the same consumption category is received. The trained optimization model for the consumption category can be utilized to determine the optimal target audience, sponsored content, and determine one or more target audiences and appropriate allocation scores. As shown in FIG. 1C, the campaign optimization system determined to present content element 144 with content publisher 142 for a particular audience instead of content publisher 122. Advantageously, by utilizing a model trained from past campaigns for the same consumption category, the subsequently sponsored content provider can begin their campaign using the learnings from past campaigns to more efficiently and quickly launch targeted campaigns, and thus, avoid reduced performance typically associated with new campaigns.

Figure 2A:
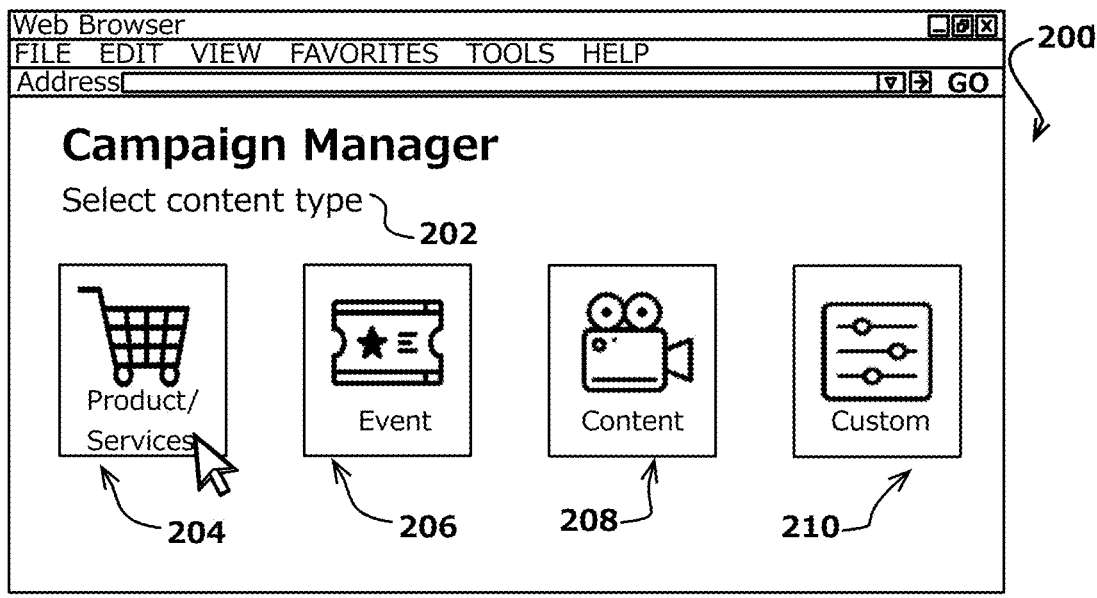
FIGS. 2A, 2B, 2C, and 2D illustrate example interfaces that can be utilized in accordance with various embodiments.

As described, an ad campaign can be monitored or otherwise managed using a console or other such ability. For example, the console can be used to set up the campaign by indicating the consumption category (e.g., the category of goods and/or services) for the campaign, indicating a target audience, specifying a commitment amount, providing sponsored content, monitoring campaign performance, among other such options, to initiate the campaign. FIG. 2A illustrates an example interface 200 that can be presented to a sponsored content provider as part of a campaign management console in accordance with various embodiments. It should be understood that reference numbers are carried over between figures for similar components for purposes of simplicity of explanation, but such usage should not be construed as a limitation on the various embodiments unless otherwise stated. In this example, a sponsored content provider (e.g., an advertiser, media provider, or other such entity) can utilize campaign manager interface to select a type of sponsored content 202 or consumption category for the campaign. In accordance with various embodiments, the consumption category can be selected or otherwise identified (e.g., an alphanumeric identifier) from a catalog of consumption categories. In an embodiment, individual consumption categories can be represented by an identifier and can be used to classify products and services. Example categories include t-shirts, graphic t-shirts, musical concerts, etc. It should be noted that the categories mentioned are example categories and fewer or more categories can be included in the catalog of consumption categories. In accordance with various embodiments, the catalog of consumption categories can be updated, for example, by adding, removing, amending categories. The catalog of categories can be obtained from third-party providers of such information and/or based on consumption catalogs associated with these providers. For example, the catalog of categories can be based on, for example, the National Institute of Governmental Purchasings' Commodity/Services Code, import Export Classification, ITC (HS) Code, Merchant category codes, United Nations Standard Products and Services Code, etc.

In this example, the sponsored content provider can select between products/services 204, events 206, media content (e.g., images and/or video) 208, or custom content 210. In various embodiments, the sponsored content provider can further refine their selection by inputting an appropriate code or goods/service description, selecting from a listing of consumption categories, etc. Products can include, for example, an article or substance that is manufactured or refined for sale. Services can include, for example, include educational services, communication services, transportation services, health services, etc. Content can include, for example, the textual, visual, or aural content that is encountered as part of a user experience on websites and/or other interfaces. Example content includes text, images, sounds, videos, animations, etc. Custom can include one or more of the other content types as well as additional content types.

Figure 2B:
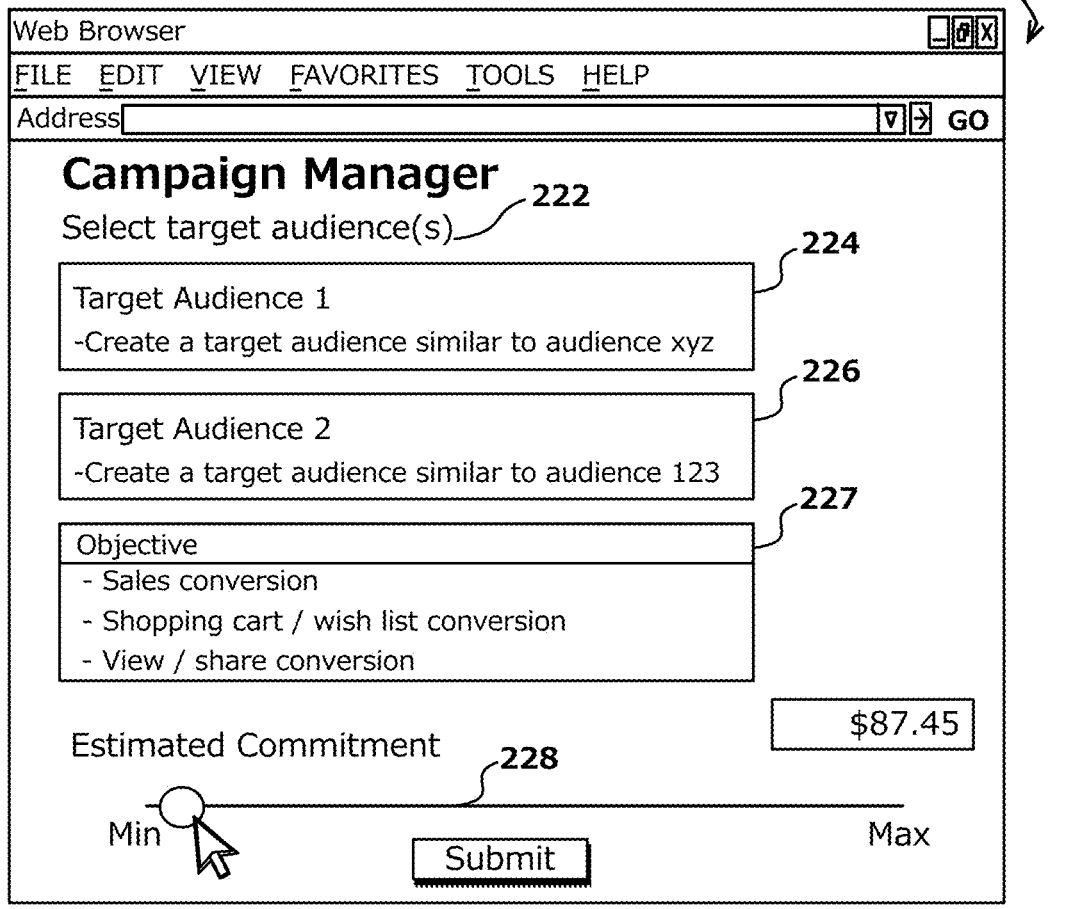

Once a selection of the consumption category or content type is received, information for various audiences can be displayed such as illustrated in interface 220 of FIG. 2B. In this example, the management console can display a list of suggested audiences 222 to the sponsored content provider or other authorized users, where the suggested audiences can include, for example, users associated with one or more content publisher networks. In this example, each target audience suggestion (224, 226) includes a title and a description of the audience, although other information can be included as well, such as historical performance of the audience, a number of users in the audience, anticipated performance of the audience for the campaign, etc.

In accordance with various embodiments, other options can be provided as well, such as a desired objective of the campaign 227, a commitment amount 228 or campaign budget for the campaign, etc. For example, as shown in FIG. 2B, interface 220 can include a drop-down list or other such presentation of objectives 227 to enable the user to select one or more objectives of the campaign. In some embodiments, the user can rank the objectives by importance. Ranking the objectives by importance can include arranging the objectives from, e.g., top to bottom, the top representing the most important object, assigning a score to the objectives, etc. The objectives can include a number of conversion events, for example, a sales conversion event, a save conversion event, a view conversion event, among other such conversions. A sales conversion event can include an amount of revenue generated from a campaign, a number of sales generated from the campaign, etc. The save conversion event can include a total amount of potential revenue for items saved to an electronic shopping cart, wish list, user account, or other such electronic storage, a total number of saves, etc. The view conversion event can include a total number of views of the sponsored content for the campaign, including in some embodiments the total number of shares of the sponsored content.

The interface can further include one or more slider bars or other such elements to enable a user to adjust a commitment value or campaign budget for the campaign. As will be described further herein, during the campaign, a campaign optimization system can automatically allocate the campaign budget among one or more target audiences and/or between additional new target audiences identified by the system. In an example, a matching and/or ranking algorithm can be used to determine audiences that are satisfying one or more performance parameters or objectives, and the campaign budget can be allocated to one or more of those audiences accordingly. For example, the budget can be allocated to the highest performing audience or allocated to two or more audiences based on the performance of those audiences and/or the objective of the sponsored content provider. In at least some embodiments, the audiences utilized by an electronic retailer or provider of an electronic marketplace, where products and/or services may be marketed via the campaign. Various other options can be presented to a user to help define an audience as well within the scope of the various embodiments.

Figure 2C:
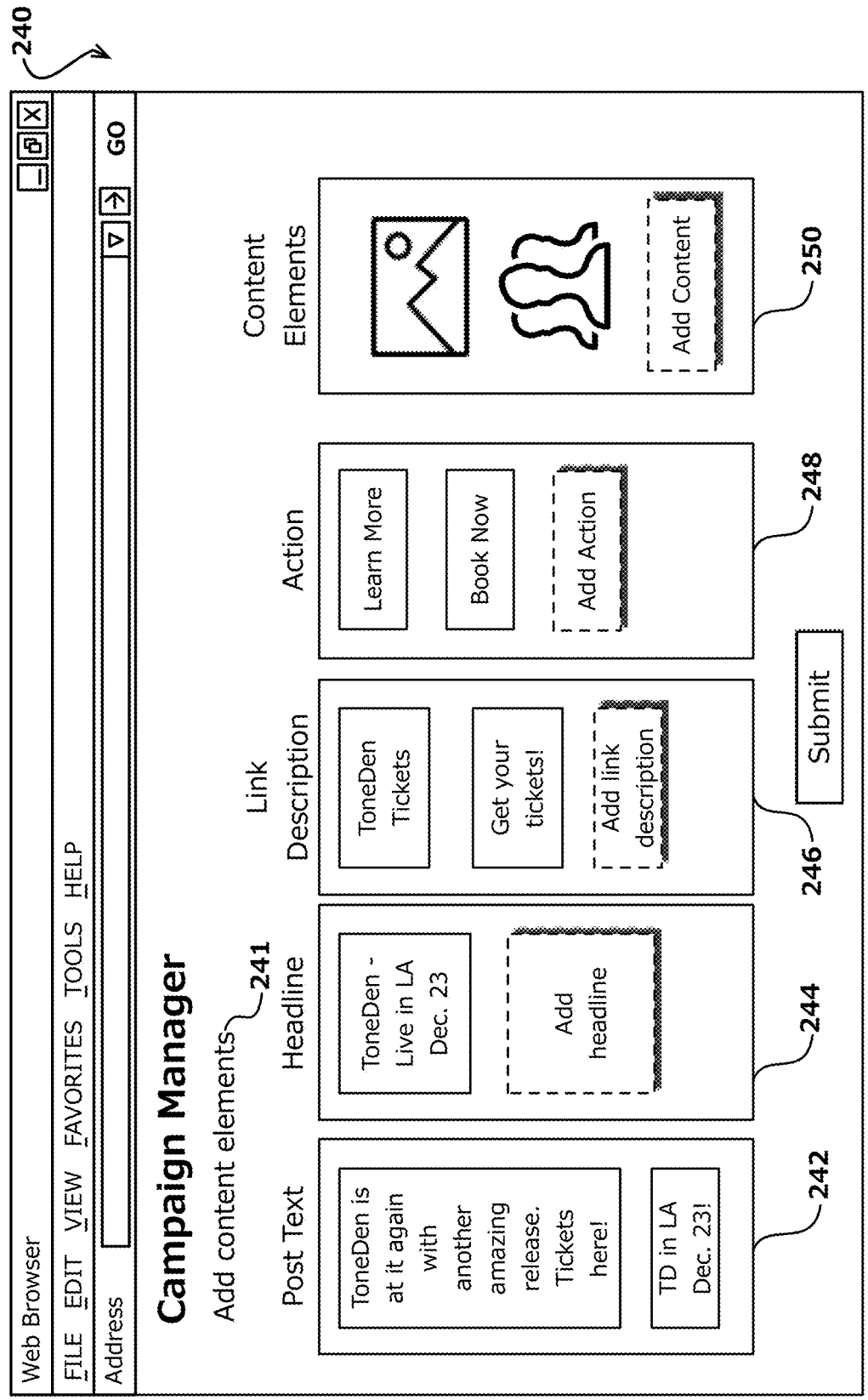

An interface to upload or otherwise provide content can be displayed such as illustrated in interface 240 of FIG. 2C. The interface can include at least sections 242, 244, 246, 248, and 250 to add text, a headline, a description for a link, an action, and content elements respectively, to a campaign. Text can include, for example, a textual description of the sponsored content for the goods, services, and/or event represented in the sponsored content element. A headline can include, for example, a title or other text or the goods, services, and/or event represented in the sponsored content element. Link description can include, for example, a textual description displayed for a user selectable link such as a URL or other such link of the goods, services, and/or event represented in the sponsored content element. Action can include, for example, an action taken when a selection event is received. Example actions include launching an interface (e.g., a popup, an overlay, a webpage, an application, etc.) to present additional information to allow for a user action such as downloading a file, an application, book an event, schedule an event, initiate a call, etc.

Once the sponsored content provider is satisfied with the campaign set up, the sponsored content provider can submit the campaign and, assuming the sponsored content, creative, images, and other advertisement content has been provided, the campaign can begin. In accordance with various embodiments, the campaign optimization system can attempt to adjust various parameters (e.g., target audiences, allocation of budget, etc.) automatically to attempt to meet specified targets, objectives, or goals for the campaign, or to stop the campaign if performance falls below a specified level or threshold (e.g., percentage of conversions). Automatically adjusting the parameters can be based on upon performance data for the campaign and/or similar campaigns. In addition to the data discussed above, other data can be used to attempt to adjust parameters for a campaign for a particular user, such as may include the age, gender, geographic location, education level, etc. As will be described further herein, storing performance data and using this data to optimize the campaign can help the system to become more accurate over time. Using dates or decays can also help the adjusted parameters to remain accurate as user interests change over time.

Figure 2D:
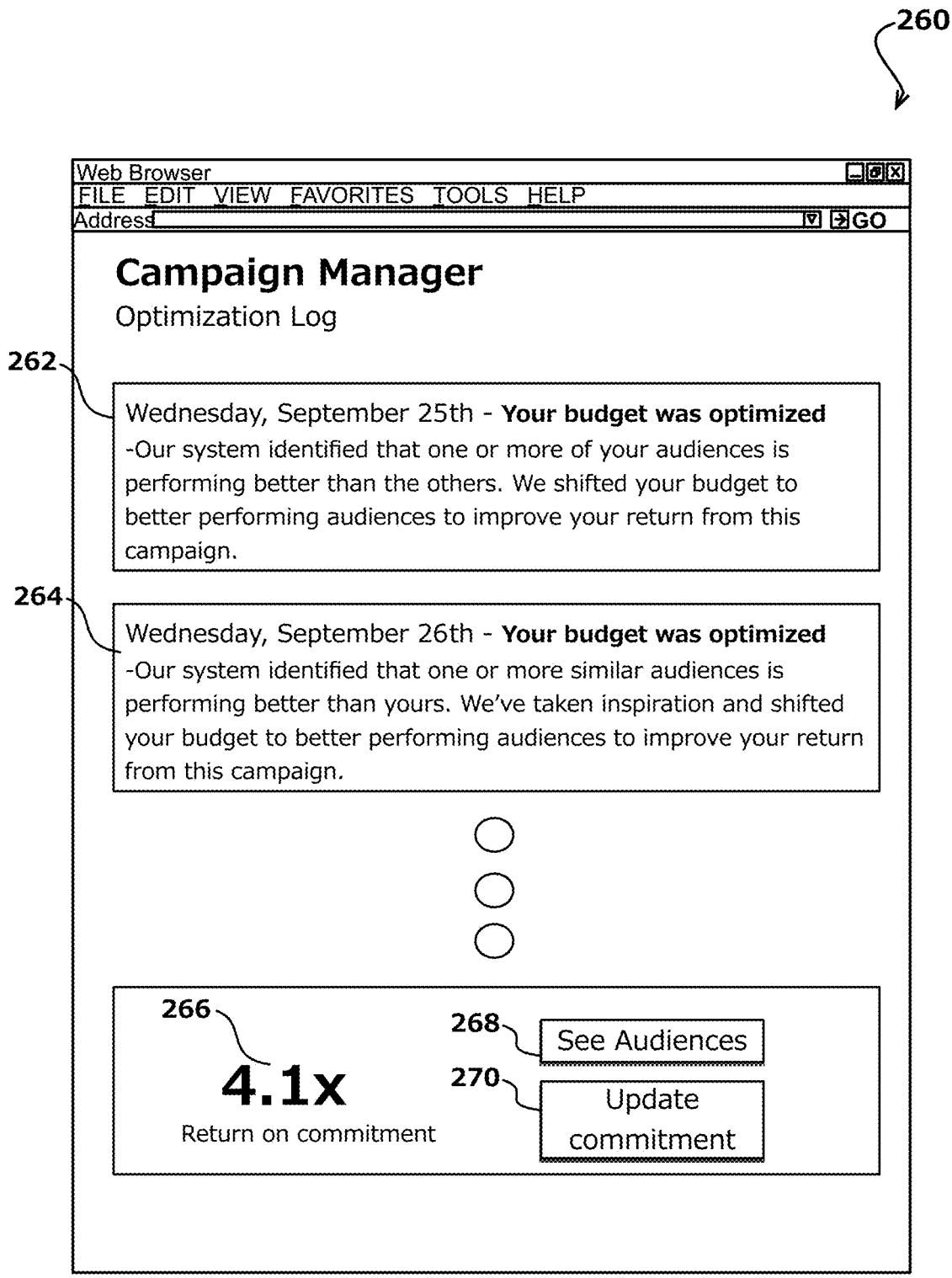

In at least some embodiments, the sponsored content provider can access the console during the campaign to view actual performance numbers and updated performance estimates, and can adjust campaign parameters (e.g., by adjusting the target audience, suggest new audiences, etc.) to attempt to improve or otherwise adjust performance. For example, FIG. 2D illustrates an example interface 260 of an optimization log in accordance with various embodiments. In this example, interface 260 can present results 262, 264 of various optimization algorithms. The results can describe an action that was taken, such as optimizing the campaign budget. As described herein, this can include automatically allocating the campaign budget among target audiences across different content publisher networks. In some embodiments, the return on the campaign 266 can be presented as well as other options such as an option to view targeted audiences 268, to update the campaign budget 270, among other such options.

Figure 3:
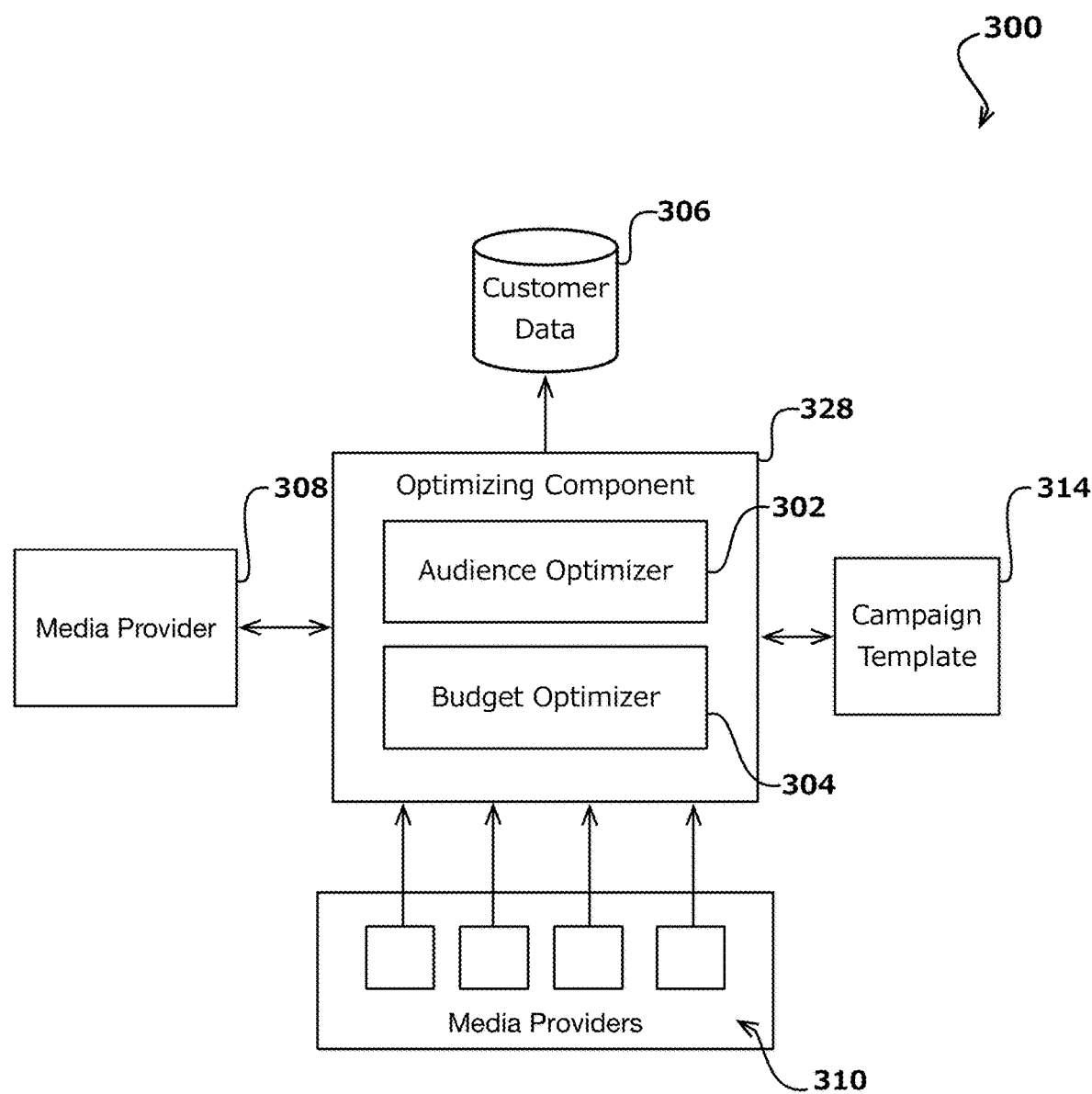
FIG. 3 illustrates an example system for optimizing a campaign in accordance with various embodiments.

FIG. 3 illustrates an example system 300 for optimizing a sponsored content campaign in accordance with various embodiments. In this example, optimizing component 328 can be used to optimize content campaigns for sponsored content providers (e.g., media providers, advertisers, etc.) across different content publisher networks such as social media networks, electronic marketplaces, search engines, etc. Optimizing component 328 can include or be in communication with audience optimizer component 302 and budget optimizer component 314. Optimizing component 328 may also be coupled to customer data store 306. The data store can be accessed by any of the components of optimizing component 328 or other appropriate components to obtain data to perform the functionality of the respective component. Optimizer component 328 can be configured to communicate with requesting sponsored content provider 308 and one or more other sponsored content providers 310. Although optimizing component 328 is shown as a single component, optimizing component 328 may be hosted on multiple server computers and/or distributed across multiple systems. Additionally, the components may be performed by any number of different computers and/or systems. Thus, the components may be separated into multiple services and/or over multiple different systems to perform the functionality described herein.

In this example, sponsored content provider 306 initiates an advertising campaign by submitting a content placement request or other such requests. The content placement request can be received at optimizing component 328 and can be associated with one or more campaign attributes. In an embodiment, the attributes can include, for example, information for a consumption category, a campaign budget or commitment amount, a campaign duration, suggested target audiences, a campaign objective, sponsored content such as advertising content, etc. The campaign attributes can be stored in customer data store 306 along with historical performance data from past campaigns associated sponsored content providers 310. In accordance with various embodiments, the historical performance data can include, for example, data on conversion events for past electronic content campaigns for a particular consumption category.

In response to the content placement request, audience optimizer 302 can determine one or more target audiences based on attributes associated with past campaigns for content providers 310. For example, audience optimizer 302 can use one or more matching or similarity algorithms to identify past campaigns of sponsored content providers 310 associated with the same consumption category as the requested campaign of sponsored content provider 308. Once the target audiences are determined, budget optimizer 304 can determine an appropriate budget for individual audiences. As will be described further herein, this can include, for example, determining allocation scores for target audiences which can be used to dynamically determine an allocation of resources to appropriate audiences or segments. When an attempt is then made to allocate an advertising budget to one or more audiences across one or more content publisher networks, budget optimizer 304 can be used to allocate the budget across one or more content publisher networks based on the allocation scores. Thereafter, campaign template 314 can be generated that includes the target audience(s), sponsored content, and budget allocation, and any other information for the campaign. The performance of the campaign may be monitored, and the amount allocated to target audiences may be adjusted to optimize the effectiveness of the campaign. For instance, if the initial audience does not result in a positive return on investment (or if a better return on investment is predicted if more money is spent on another audience), money in the budget may be reallocated to audiences expected to perform better regarding return on investment.

In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the message service. In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 4:
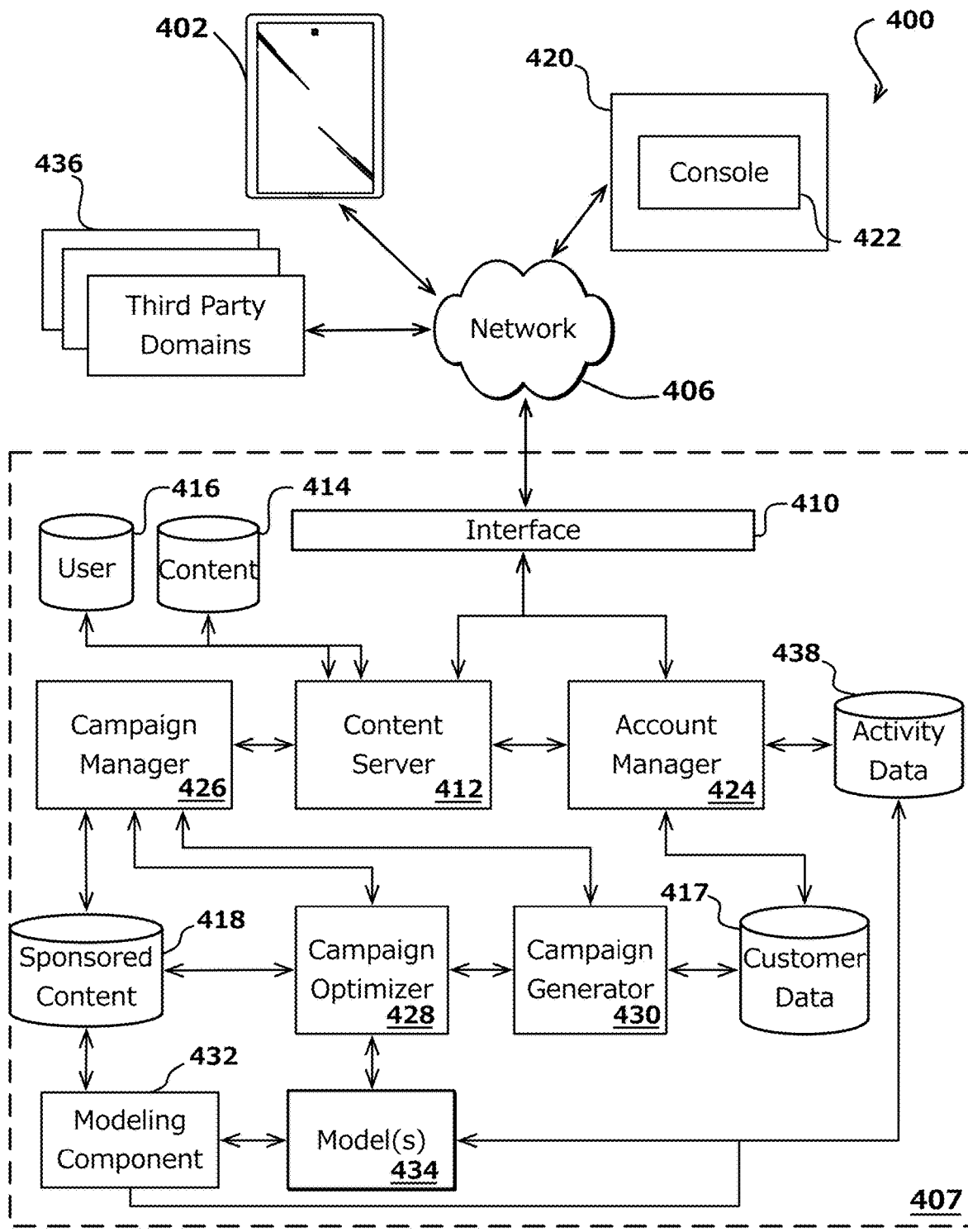
FIG. 4 illustrates an example environment in which aspects of the various embodiments can be implemented.

FIG. 4 illustrates an example environment 400 in which aspects of the various embodiments can be implemented. In this example, a user can utilize an application or interface, such as a browser, executing on a client device 402 to send requests for content over at least one network 406. The client device 402 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others. In this example, the client device 402 is in communication with a resource provider 407 via the at least one network 406. The at least one network can include a wired and/or wireless network, as may include the Internet, a cellular network, a local area network (LAN), an Ethernet, an Intranet, and the like. The client device 402 may have varied local computing resources, such as may include central processing units and architectures, memory, mass storage, graphics processing units, communication network availability and bandwidth, etc.

The request can be received to an interface and/or networking layer 410 of the provider environment 407. The interface and/or networking layer can include any of a number of components known or used for such purposes, as may include one or more routers, switches, load balancers, Web servers, application programming interfaces (APIs), and the like. The request, or information for the request, can then be directed to an appropriate server 412 or another component of the provider environment 407. The server 412 can be any appropriate type of server or other such computing devices, as may include one or more application servers operable to process instructions provided by a user or database servers operable to process data stored in one or more data stores in response to a user request. In some embodiments, the request may be a request for content stored in a content data store 414 or other such location, as may be determined by a server 412 receiving information for the request. The server, or another such component, can also determine a category for which to display the content such as sponsored content for the page, as may be determined by contents of the page and/or information stored in a user profile data store 416 or other such location. Upon determining an appropriate category, the server can cause sponsored content such as sponsored content from at least one sponsored content data store 418 to be served to the client device along with the content for the request. In at least some embodiments, the sponsored content data store can be part of, or external to, the provider environment 407. As known for such purposes, in some embodiments the content returned to the client device will include a link or other call for sponsored content or other related content that can then be served from a third-party provider or other such sources.

The sponsored content can be provided by a sponsored content provider such as an advertiser or other appropriate entity, who can use computing device 420 to provide and/or specify the sponsored content and parameters to use in determining when to provide the sponsored content. In at least some embodiments, the sponsored content provider can utilize a campaign management console 422, such as the management console described in FIG. 1 and elsewhere herein or other appropriate program or mechanism, to initiate a sponsored content campaign, specify sponsored content for the campaign, view projected performance, monitor actual performance, etc. In some embodiments, the sponsored content provider might instead utilize a browser or other interface to access functionality executing in the provider environment 407. Various other such options can be utilized as well within the scope of the various embodiments. As mentioned, using a conventional approach does not optimally reflect the interests of various sponsored content providers, and does not allow sponsored content providers to easily determine the appropriate audiences, or categories of audiences, to target. Further, whether content is targeted to an appropriate audience can be difficult or impossible to determine initially. Consequently, performance is often poor for initial content campaigns and sponsored content providers fail to create subsequent campaigns. In the situation sponsored content providers proceed with subsequent campaigns, significant time and resources are typically used before desired results can be obtained. It can be desirable, in at least some embodiments, to instead be able to determine an appropriate audience or segment of the audience that is more appropriate for a particular sponsored content campaign. It further can be desirable to utilize an iterative and/or interactive development process that builds or otherwise determines appropriate audiences for various sponsored content providers and/or campaigns. Further still, it can be desirable in at least some embodiments to develop a better understanding of the potential interests of a set of users, such that sponsored content can be targeted to those users who are most likely to be interested in the sponsored content, or who are most likely to meet a specified metric, such as to view an ad, click on an ad, generate a conversion as a result of the ad, etc.

Accordingly, approaches in accordance with various embodiments can utilize a model for each of a set of campaigns for which relevant campaign information is available, and the models can be matched and utilized in appropriate campaigns based at least in part on a consumption category associated with a respective campaign. In accordance with various embodiments, performance data (e.g., data on conversion events) for past sponsored content campaigns can be used to train an optimization model. The performance data can be obtained from sponsored content providers (e.g., advertisers) who provide sponsored content or otherwise advertise with one or more content publishers for a consumption category. The trained optimization model can then be utilized to determine allocation scores that quantify a relationship between at least one target audience (e.g., a group of users on a publisher's website) and the consumption category. In response to a content placement request, such as an ad campaign request or other such requests, to present content, allocation scores for target audiences can be determined and used to determine information for the campaign such as an allocation of resources to appropriate audiences or segments. When an attempt is then made to allocate a commitment value such as an advertising budget to one or more audiences across one or more content publisher networks, the optimization model can be used to return ranked results of various audiences. The commitment value can be automatically allocated among target audiences across different content publisher networks. Thereafter, the sponsored content may be sent to the content publisher to be displayed by the content publisher when keywords or other events occur at the content publisher website.

For example, as shown in FIG. 4, the provider 407 can include account manager component 424, campaign manager component 426, campaign optimizer component 428, campaign generator component 430, training component 432, and modeling component 434, although additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein.

In accordance with various embodiments, sponsored content providers can submit content placement requests such as an ad campaign request or other such requests. The requests can be received at account manager 424 or another appropriate component. The content placement request can include a number of attributes associated with the sponsored content provider and/or ad campaign or other such campaigns such as information for a consumption category, a campaign budget or commitment amount, a campaign duration, suggested target audiences, a campaign objective, sponsored content such as advertising content, etc.

Account manager 424 can obtain historical performance data (e.g., data on conversion events) for past electronic content campaigns for a particular consumption category. The data can include, for example, information for content features and particular events, for example, content served, content clicked, and content leading to consumption (e.g., purchases, renting, leasing, etc.) Certain actions can identify the events. For example, in accordance with various embodiments, an impression event can occur when content is displayed on content publisher website, a click event can occur when content is clicked, a save event can occur when goods and/or services represented by the content is saved to an electronic shopping cart, list, etc., and a purchase event can occur when content leads to a purchase. In this example, the account manager can be implemented via hardware and/or software. Various other components can be utilized as well as discussed and suggested elsewhere herein.

The account manager 424 can be configured to gather information for various sponsored content providers from one or more sources, and aggregate this information into a document, file, model, or other such data object for each sponsored content provider, or at least sponsored content providers satisfying a specified criterion (e.g., are associated with past ad campaigns), etc. In various embodiments, the information can be associated with consumption categories and or other information to associate a campaign for a sponsored content provider with a particular consumption category. In at least some embodiments, the account manager 424 can receive (as a result of a request, push, or other such flow) data from one or more specified sources of data that can be useful for identifying potential target audiences of interest. For example, the account manager 424 can look at information stored in the customer profile data store 417 to determine information available in the environment, such as information for past and/or current campaigns related to a particular consumption category. Account manager 424 can also pull information associated with a particular consumption category from one or more third party data sources 436 as well. These can include any appropriate data sources, such as social networking sites, electronic retail sites, data feeds, and the like. Any source that can provide information about ad campaigns a customer has launched can be used to obtain data for that customer. Account manager 424 in at least some embodiments can aggregate this data into an appropriate file for each customer and tag or associate the information with a corresponding consumption category. The file can include tags or metadata that can be used to designate types of data included in the file. For example, a file might include a list of items for a campaign that a user purchased with metadata or tags indicating that the user purchased those items (as well as potentially when the user purchased the items), the consumption category of those items, and a separate list of items the user viewed but did not purchase and associated consumption category, with similar metadata for those items. Similarly, tags might be used to indicate the source of each entry, the date and/or time of each entry, the number of times the entry was received (such as for multiple views), the result of the interaction (a conversion or subscription), etc.

Account manager 424 also can index the file for each sponsored content provider. Account manager 424 can function similar to an indexing component in a search context, which can index each of a set of files to help matches to a query be located more quickly. For example, indexing component can index with respect to consumption categories. As known for such purposes, an indexer can collect, parse, and store data to facilitate fast and accurate information retrieval. As known in the search space, indexing can prevent a search engine from having to scan each of the user documents for every query received. Account manager 424 can cause the data to be stored in an appropriate location, such as in the customer activity data store 438 or another appropriate location, enabling the index data to be accessible upon receiving of a request from console 422, training component 432, or other such authorized source.

Campaign manager 426 can work with campaign optimizer 428, campaign generator 430, and other appropriate components to attempt to determine the best selection of audiences to satisfy the various requests, as well as monitor the performance of the campaign, and the amount allocated to target audiences to optimize the effectiveness of the campaign. In this example, campaign generator 430 can generate a set of target audience options based on the received campaign requests for a consumption category, such as a specified good, event, and/or service over a specified period of time. In an example, campaign generator 430 can utilize the functionality of audience optimizer 302 described in FIG. 3 to determine one or more target audiences based on attributes associated with a sponsored content provider and attributes associated with a plurality of other sponsored content providers. In certain embodiments, the components can perform the same or similar functionality. For example, campaign generator 430 can use one or more matching or similarity algorithms to match attributes associated with a campaign for one sponsored content provider with attributes associated with campaigns for a plurality of sponsored content providers to determine appropriate audiences or segments based upon a level of similarity between the requested campaign and past campaigns.

In various embodiments, similarity scores or other such scores or values can be determined that indicate a similarity of content placement requests fulfilled by other sponsored content providers with respect to the current sponsored content provider for a particular consumption category. For example, in the situation where campaign attributes for a current sponsored content provider are similar or satisfy a threshold level of similarity to campaign attributes of past campaign attributes of other sponsored content providers, the similarity scores can reflect such a match (i.e., be associated with a higher value). In the situation where campaign attributes for a current sponsored content provider are not similar or fail to satisfy a threshold level of similarity to campaign attributes of past campaign attributes of other sponsored content providers, the similarity scores can reflect such a match (i.e., be associated with a lower value). In various embodiments, the level of similarity can be based on, for example, the level of similarity of consumption categories for the campaigns. For example, two campaigns associated with the same consumption category are more similar than two campaigns associated with related (or different) consumption categories. Accordingly, the level of similarity can change based at least in part on the relationship between consumption categories.

Campaign optimizer 428 can perform an optimization process based at least in part on the target audiences to, for example, determine an appropriate budget for each of the audiences. In various embodiments, campaign optimizer 428 can utilize the functionality of budget optimizer 304 to generate an audience "quality" score or other such scores such as an allocation score which can be used to dynamically determine an allocation of resources to appropriate audiences or segments. This can include in certain embodiments using a model, function, or other such algorithms to determine appropriate allocation scores. The functions carried out by one or more model(s) can be represented by model(s) 434. In various embodiments, the models can be tuned for a particular campaign attribute, such as for consumption category.

In accordance with various embodiments, campaign optimizer 428, campaign generator 430, modeling component 432, and model(s) 434 can be associated with, or otherwise included with, optimizing component 328 of FIG. 3. For example, campaign optimizer 428 can implement the functionality of budget optimizer 304 and campaign generator 430 can implement the functionality of audience optimizer 302. Various other approaches can be used as well as would be understood to one of ordinary skill in the art in light of the teachings and suggestions contained herein.

In at least some embodiments, the model(s) can be implemented independently of a particular implementation of an optimization algorithm. Such an approach can enable the model(s) to be used as a comparative metric of different approaches based on specific campaign attributes (e.g., consumption category, content publisher, etc.) Further, such an approach enables various optimization models to be utilized that can apply different optimization approaches to the various audience options to attempt to develop additional audience options and potential solutions, which can help to not only improve efficiency but can also potentially provide additional insight into the various options and their impact or interrelations.

As described, in some embodiments a console 422 can be utilized that displays the results of various optimization algorithms and enables a customer to compare the various results and factors in an attempt to determine the solution to implement, which may not necessarily provide the best overall score. For example, there might be minimum values or maximum values of various factors that are acceptable, or a provider might set specific values or targets on various factors and look at the impact on the overall value and select options based on the outcome. In some embodiments, the customer can view the results of the objective function as well, before any optimization is applied, to view the impact of various factor changes on the overall score. Such an approach also enables a customer or provider to test new optimization algorithms before selecting or implementing them, to determine the predicted performance and flexibility with respect to existing algorithms.

As described, approaches described herein allow for algorithms to evolve automatically over time, as may be done using random experimentation or based on various heuristics. As these algorithms evolve, a value of a return on investment can serve as a measure of fitness or value of a new generation of algorithms. Algorithms can change over time as the demands change, as well as to improve the same or similar conditions. Such an approach may also be used to anticipate future changes and their impact on the campaign, as well as how the various factors will change.

In some embodiments, artificial intelligence-inclusive approaches, such as those that utilize machine learning, can be used with campaign manager 426, optimizer 428, campaign generator 430, and other appropriate components to further improve campaign performance over time. Improving campaign performance can include, for example, improving an initial campaign and/or active campaigns. For example, information for various campaign events (e.g., conversion events and other such performance data, etc.) may result in a change in the campaign performance which can be fed back into machine learning algorithms utilized by campaign manager 426, campaign optimizer 428, campaign generator 430, and the like, to learn the appropriate weightings, values, ranges, or factors to be used to determine appropriate target audiences and/or allocation scores for those audiences. In some embodiments, optimization functions to determine appropriate target audiences and/or allocation scores for those audiences may be produced by a machine learning process, such as one generated by modeling component 432, that takes into account campaign attributes and performance data to generate an appropriate model or function to determine appropriate target audiences and/or allocation scores and evolves that function over time based upon more recent performance data and other feedback campaign data, as the machine learning model is further trained and able to develop and recognize new relationships. Modeling component 432 can, for example, analyze various sources of performance data, campaign attributes, and sponsored content from data stores 418 and 438 to determine appropriate target audiences and/or allocation scores. In various embodiments, the performance data can be for a particular consumption category. For example, data for a first consumption category can be used to train a first optimization model for the first consumption category and data for a second consumption category can be used to train a second optimization model for the consumption category. In various embodiments, an optimization model can be trained for a set of consumption categories and is not associated with a particular consumption category. As described, the data can describe a plurality of content placement requests received from sponsored content providers seeking to fulfill content placement requests from the content publisher over a period of time for a particular consumption category. In an embodiment, the trained models can be used to determine audiences and assign an allocation score to each audience, and the score can be used to rank the audiences accordingly and determine a corresponding budget allocation. When an attempt is then made to determine an appropriate audience and/or allocate a commitment value such as a sponsored content budget to one or more audiences across one or more content publisher networks, the allocation scores or other such weight for each audience can be used to allocate a portion of the campaign budget to respective audiences.

Various budget allocation methods can be used in accordance with the various embodiments, and in at least some embodiments the allocation can be used as a metric for optimizing a campaign. Additionally, cost factors in some embodiments can be evaluated in combination with one or more revenue or profitability factors. For example, a first audience option might have a higher cost than a second audience option but might also be able to recognize higher revenue and generate higher satisfaction. Certain audiences optimized for a particular objective or conversion type (e.g., saved-to-cart or wish list, etc.) might have a relatively high initial cost for the campaign, but those audience members may convert to a paying member. Thus, the fact that this audience has a higher cost (or lower return) should not necessarily have it determined to be a lower value option than others with lower cost but also lower revenue. Various allocation algorithms may exist that determine how many of a particular conversion type for a particular campaign would need to occur. The allocation can be balanced with consumer satisfaction and willingness to accept the tradeoff for a delayed return, among other such factors. The allocation can also take into account various other factors as well, such as the content type, the time of year/day, holidays, and the like. In some embodiments, there might also be different types of audience members, such as an audience member who typically purchases goods and/or services online, purchases goods and/or services from advertisements, who share sponsored content, etc. These various factors can be considered in the evaluation and optimization of the various audiences and/or budget allocation options.

As described, the allocation scores can be based at least in part on one or more performance metrics determined using performance data and other such information. As described herein, example performance data can include a click rate, a landing page viewing rate, a consideration rate, a purchase rate, a conversion rate, or delivery from previous content placement requests. In a illustrative example, where the performance data includes content placement requests associated with the sponsored content provider that resulted in a financial transaction with the content publisher or other such entity, allocation scores can be determined by first obtaining performance data from data store 438 describing a plurality of content placement requests from the sponsored content provider seeking to fulfill content placement requests via one or more content publishers. Based at least in part on the information, a value for the plurality of content placement requests that resulted in a financial transaction with the content publishers can be determined. In the situation where the value satisfies the threshold value of performance (e.g., the sponsored content provider obtains an acceptable conversion rate), it can be assumed that the current campaign is performing optimally, and the campaign can continue accordingly, and the campaign can continue to be monitored. In the situation where the performance scores do not meet the threshold performance level (e.g., the sponsored content provider does not obtain an acceptable conversion rate), it can be assumed a new audience should be determined and/or reallocation of budget across the available audiences.

Campaign generator 430 can generate the campaign, including, for example, generating information for audiences, budget amounts for corresponding audiences, content elements, and other appropriate information for the campaign for a content publisher network. Thereafter, the campaign may be presented in accordance with the allocation. For example, content, which may be created from templates that are selected according to the type of item to be advertised, may be sent to the content publisher to be displayed by the content publisher when keywords or other events occur at the content publisher website.

In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the message service. For example, the system can include various modules and components combined on a single device, multiple instances of a single module or component, etc. In one specific, non-limiting embodiment, campaign manager 426, account manager component 424, campaign optimizer 428, campaign generator 430, and modeling component 432, can execute on one device and content server 412 can execute on another device. In another embodiment, the components can execute on the same device.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 5:
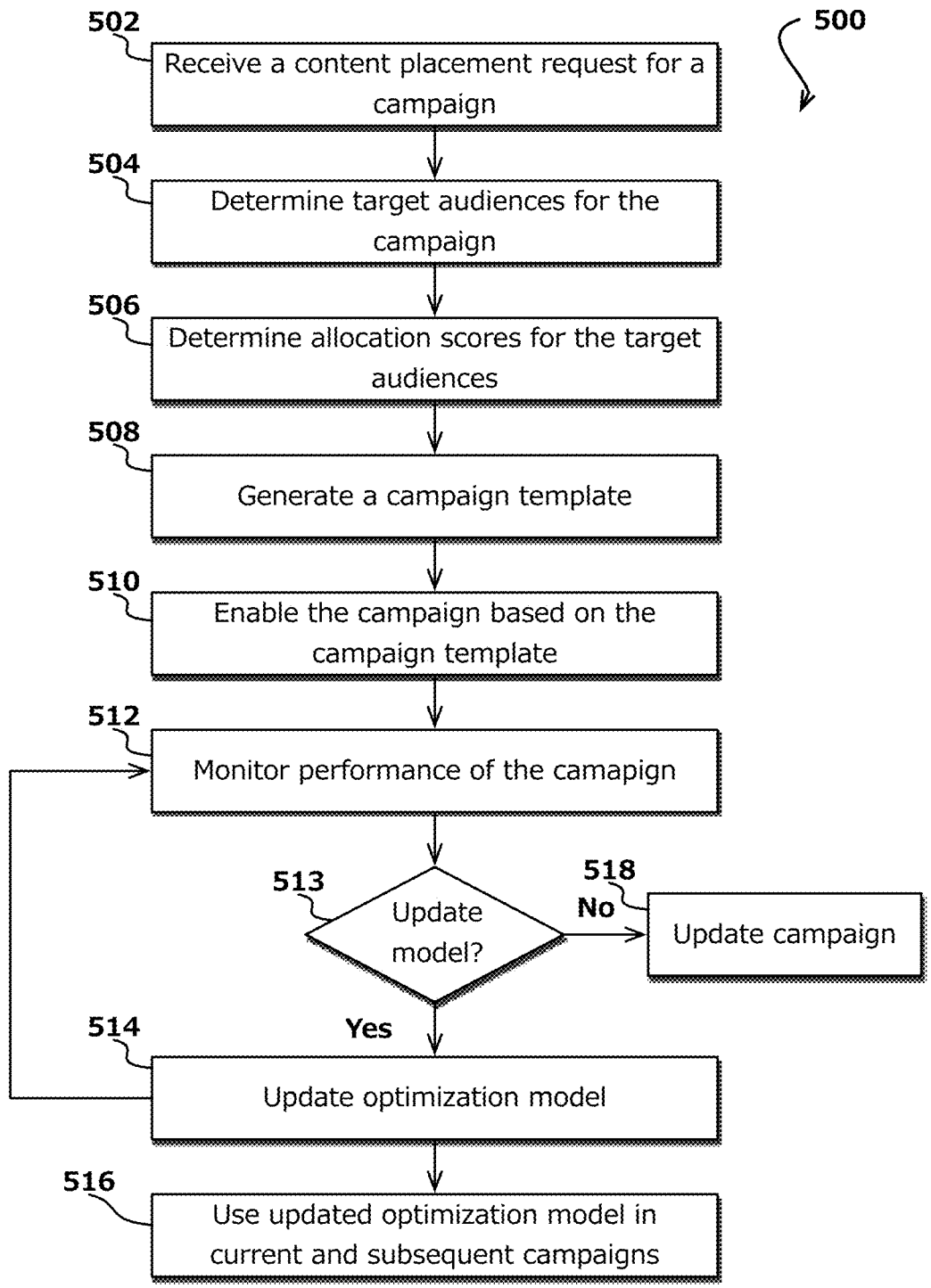
FIG. 5 illustrates an example process for enabling sponsored content providers to configure and launch a campaign that can be utilized in accordance with various embodiments.

FIG. 5 illustrates an example process 500 for enabling sponsored content providers to configure and launch a campaign that can be utilized in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a content placement request can be received 502. The content placement request can be associated with a request to initiate a campaign and information about the campaign. The information can include, for example, a consumption category, a campaign budget or commitment amount, a campaign duration, suggested target audiences, a campaign objective, sponsored content such as advertising content, etc. Target audiences for the campaign can be determined 504 based on historical performance data for campaigns associated with the same or substantially similar consumption category. As described herein, the historical performance data can be obtained from sponsored content providers (e.g., advertisers) who provide sponsored content or otherwise advertise with one or more content publishers promoting goods and/or services for the same or similar consumption category. An optimization model can be used to determine 506 allocation scores for the target audiences, where an allocation score quantifies a relationship between at least one target audience and the consumption category. In various embodiments, each target audience that is analyzed using the function, or at least that meets specific minimum criteria, can be provided with an allocation score. A campaign template can be generated 508 that includes the target audience(s), sponsored content, and budget allocation, and any other information for the campaign. Thereafter, the campaign can be enabled 510 to proceed based at least in part on the campaign template. For example, the campaign budget can be automatically allocated among target audiences across different content publisher networks, and the sponsored content can be sent to the appropriate content publisher to be displayed by the content publisher when keywords or other events occur at the content publisher website. Performance of the campaign can be monitored 512 and analyzed during the campaign to optimize the campaign dynamically. A determination 513 can be made whether to update the optimization mode. The determination can include, for example, analyzing performance metrics determined using performance data and other such information from the campaign or similar campaigns. As described herein, example performance data can include a click rate, a landing page viewing rate, a consideration rate, a purchase rate, a conversion rate, or delivery from previous content placement requests. In the situation where the performance metric includes a conversion event, a value that quantifies the conversion event for the campaign can be determined. In the situation where the value satisfies a threshold value of performance (e.g., the sponsored content provider obtains an acceptable conversion rate), it can be assumed that the current campaign is performing optimally, the optimization model can be updated 514 accordingly, and the campaign can continue to be monitored 512. Thereafter, during the current campaign, or when a subsequent content placement request for the same or substantially similar consumption group is received, the updated optimization model can be used 516 to set up the subsequent sponsored content campaign. In the situation where the performance scores do not meet the threshold performance level (e.g., the sponsored content provider does not obtain an acceptable conversion rate), it can be assumed the campaign may need adjustment, and the campaign can be updated accordingly 518 as further described in FIG. 6.

Figure 6:
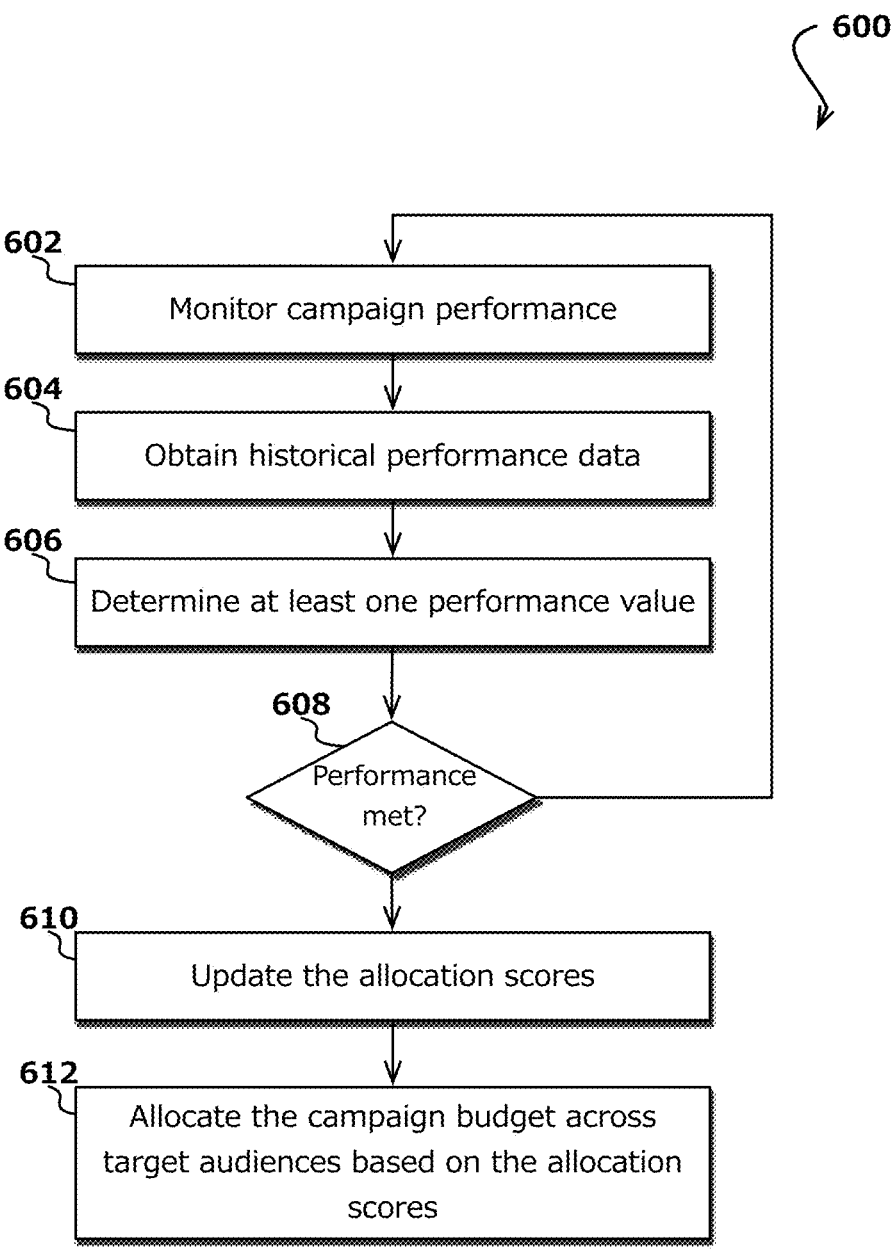
FIG. 6 illustrates an example process for updating a campaign that can be utilized in accordance with various embodiments.

For example, FIG. 6 illustrates an example process 600 for updating a campaign that can be utilized in accordance with various embodiments. In this example, the campaign performance can be monitored 602 to determine whether to update the allocation scores or other aspects of the campaign. As described, the allocation scores can be based at least in part on one or more performance metrics determined using performance data and other such information. In accordance with various embodiments, example performance data can include a click rate, a landing page viewing rate, a consideration rate, a purchase rate, a conversion rate, or delivery from previous content placement requests. In this example, where the performance data includes content placement requests associated with a sponsored content provider that resulted in a financial transaction with a content publisher or other such entity, the allocation scores can be determined by first obtaining 604 historical performance data from sponsored content providers seeking to fulfill content placement requests via one or more content publishers or other appropriate entity. Based at least in part on the historical performance data, at least one performance value for a performance metric for the plurality of content placement requests that resulted in a financial transaction with the content publishers can be determined 606. A determination 608 can be made whether the performance value satisfies a threshold level of performance. In the situation where the value satisfies the threshold value of performance (e.g., the sponsored content provider obtains an acceptable conversion rate), it can be assumed that the current campaign is performing optimally, and the campaign can continue accordingly, and the campaign can continue to be monitored. In the situation where the performance scores do not meet the threshold performance level (e.g., the sponsored content provider does not obtain an acceptable conversion rate), the allocation scores can be updated 610 in accordance with the various embodiments described herein. For example, if the initial audience does not result in a positive return on investment (or if a better return on investment is predicted if more money is spent on another audience), money in the budget may be reallocated to audiences expected to perform better in terms of return on investment. Thereafter, the campaign budget can be allocated 612 to one or more audiences based on the allocation scores.

Figure 7:
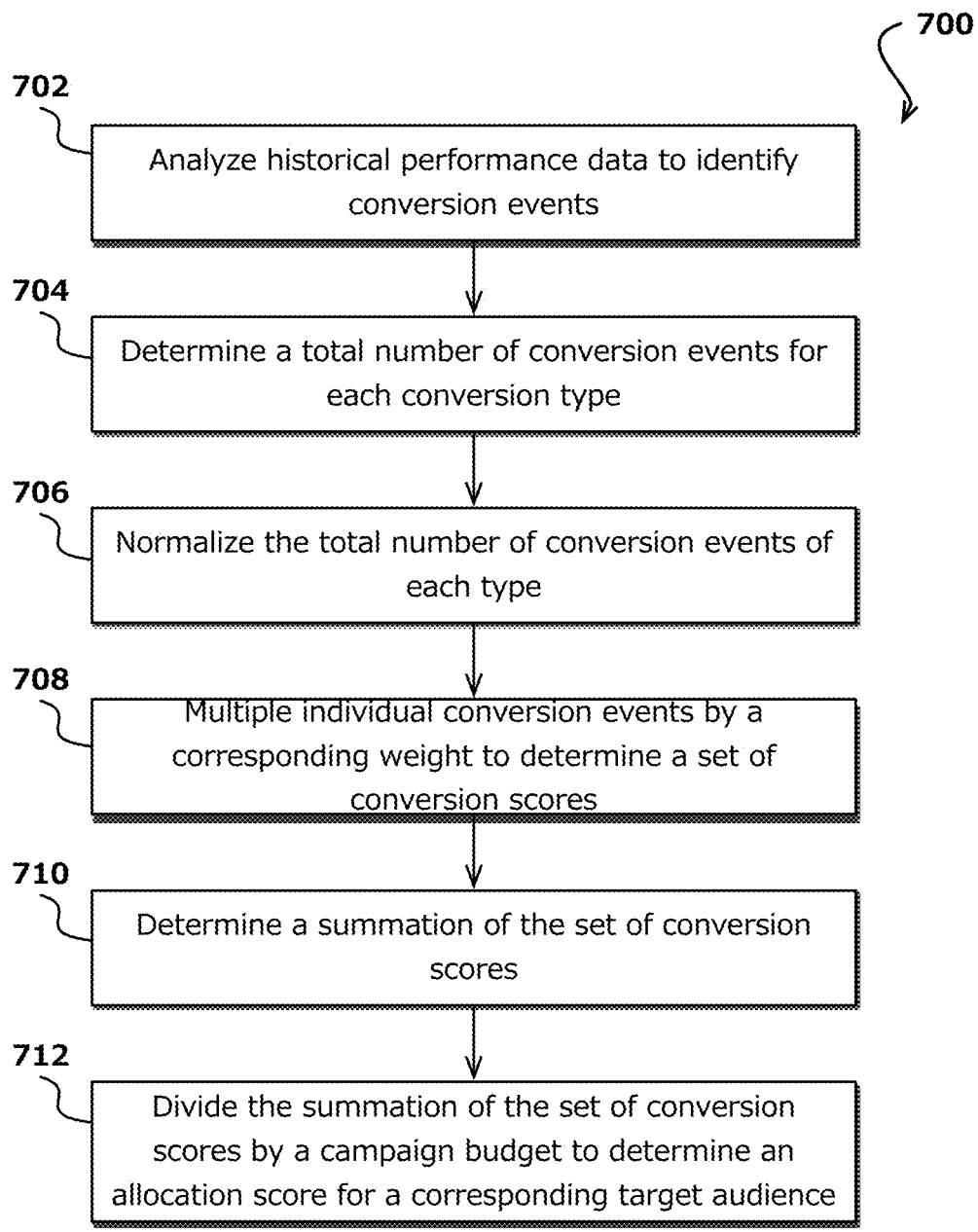
FIG. 7 illustrates an example process for determining allocation scores that can be utilized in accordance with various embodiments.

FIG. 7 illustrates an example process 700 for determining allocation scores that can be utilized in accordance with various embodiments. In this example, determining an allocation score can include, for example, analyzing 702 performance data to identify a plurality of conversion events. As described herein, a conversion event can include, for example, a sales conversion event, a save conversion event, a view conversion event, among other such conversions. A total number of conversion events for each conversion event type can be determined 704. For example, a total number of sales conversion events can be determined, a total number of save conversion events can be determined, and so on. The total number of conversion events of each type can be normalized 706 based on a total number of conversion events for a reference conversion event type. Example reference conversion events in some embodiments can include a sales conversion event, a save conversion event, a view conversion even, etc. In some embodiments, the reference conversion event type can be selected by the sponsored content provider or by some other approach such as an algorithm that selects the reference conversion event to optimize a default objective or an objective indicated by the sponsored content provider. In this example, values of a normalized conversion event can correspond to a weight for the respective conversion event, where the weight for the conversion event can quantify a level of importance of the conversion event in an advertising campaign. Thereafter, for individual target audiences, individual conversion events can be multiplied 708 by its corresponding weight to determine a set of conversion scores, a summation of the set of conversion scores can be determined 710, and the summation of the set of conversion scores can be divided 712 by a campaign budget or total commitment value to determine the allocation score for a target audience for the advertising campaign.

Figure 8:
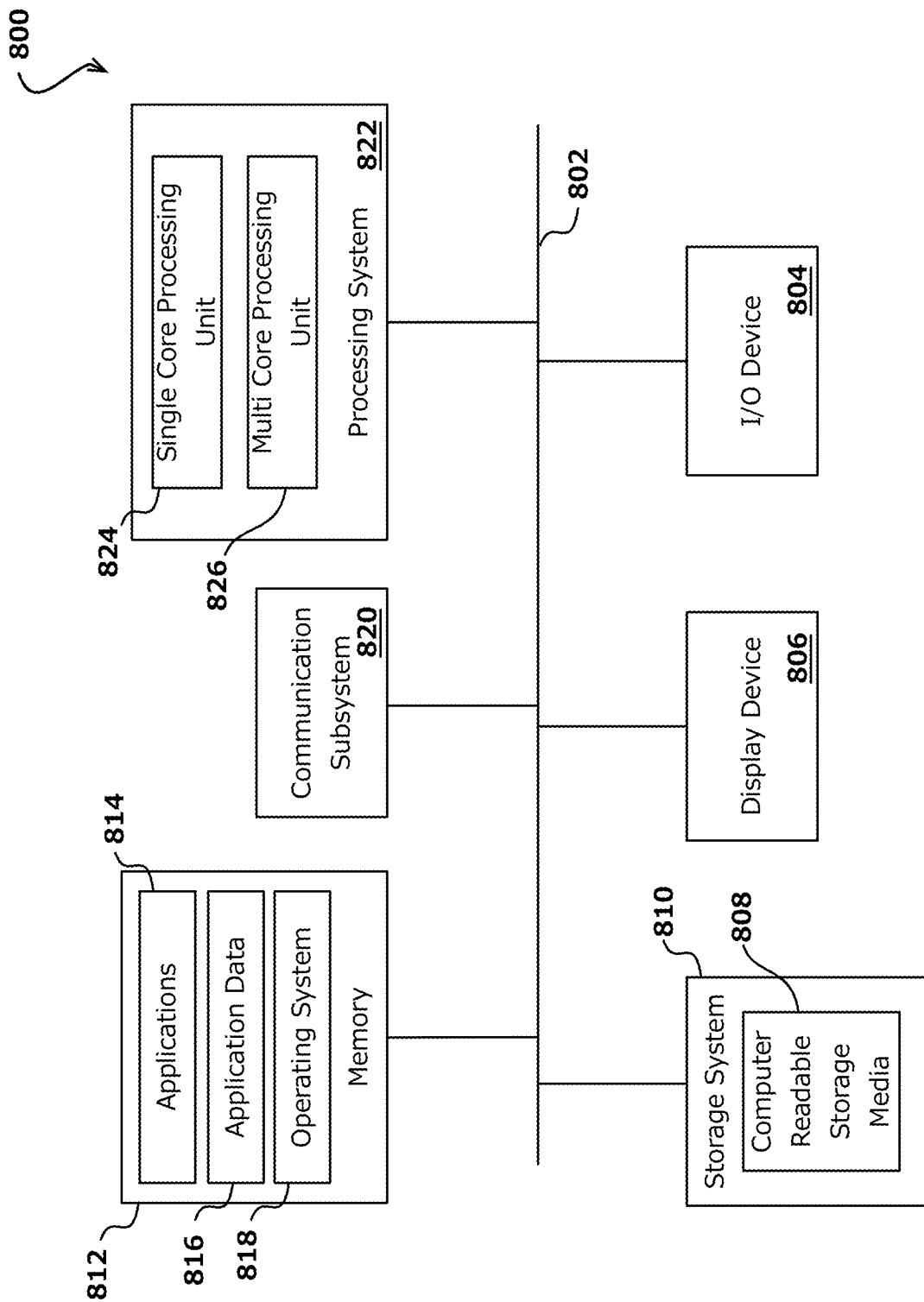
FIG. 8 illustrates example components of a computing device.

FIG. 8 shows an example computer system 800, in accordance with various embodiments. In various embodiments, computer system 800 may be used to implement any of the systems, devices, or methods described herein. In some embodiments, computer system 800 may correspond to any of the various devices described herein, including, but not limited, to mobile devices, tablet computing devices, wearable devices, personal or laptop computers, vehicle-based computing devices, or other devices or systems described herein. As shown in FIG. 8, computer system 800 can include various subsystems connected by a bus 802. The subsystems may include an I/O device subsystem 804, a display device subsystem 806, and a storage subsystem 810 including one or more computer-readable storage media 808. The subsystems may also include a memory subsystem 812, a communication subsystem 820, and a processing subsystem 822.

In system 800, bus 802 facilitates communication between the various subsystems. Although a single bus 802 is shown, alternative bus configurations may also be used. Bus 802 may include any bus or other components to facilitate such communication as is known to one of ordinary skill in the art. Examples of such bus systems may include a local bus, parallel bus, serial bus, bus network, and/or multiple bus systems coordinated by a bus controller. Bus 802 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 804 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 804 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 800 may include a display device subsystem 806. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 806 may include a controller and/or interface for controlling and/or communicating with an external display, such as any of the above-mentioned display technologies.

As shown in FIG. 8, system 800 may include storage subsystem 810 including various computer-readable storage media 808, such as hard disk drives, solid-state drives (including RAM-based and/or flash-based SSDs), or other storage devices. In various embodiments, computer-readable storage media 808 can be configured to store software, including programs, code, or other instructions, that is executable by a processor to provide the functionality described herein. In some embodiments, storage system 810 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 810 can include a media reader, card reader, or other storage interfaces to communicate with one or more external and/or removable storage devices. In various embodiments, computer-readable storage media 808 can include any appropriate storage medium or combination of storage media. For example, computer-readable storage media 808 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 812 can include various types of memory, including RAM, ROM, flash memory, or other memory. Memory 812 can include SRAM (static RAM) or DRAM (dynamic RAM). In some embodiments, memory 812 can include a BIOS (basic input/output system) or other firmware configured to manage initialization of various components during, e.g., startup. As shown in FIG. 8, memory 812 can include applications 814 and application data 816. Applications 814 may include programs, code, or other instructions, that can be executed by a processor. Applications 814 can include various applications such as browser clients, campaign management applications, data management applications, and any other application. Application data 816 can include any data produced and/or consumed by applications 814. Memory 812 can additionally include operating system 818, such as macOS®, Windows®, Linux®, various UNIX® or UNIX- or Linux-based operating systems, or other operating systems.

System 800 can also include a communication subsystem 820 configured to facilitate communication between system 800 and various external computer systems and/or networks (such as the Internet, a local area network (LAN), a wide area network (WAN), a mobile network, or any other network). Communication subsystem 820 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 820 can include hardware and/or software components to communicate with satellite-based or ground-based location services, such as GPS (global positioning system). In some embodiments, communication subsystem 820 may include, or interface with, various hardware or software sensors. The sensors may be configured to provide continuous or and/or periodic data or data streams to a computer system through communication subsystem 820

As shown in FIG. 8, processing system 822 can include one or more processors or other devices operable to control computing system 800. Such processors can include single-core processors 824, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 822, such as processors 824 and 826, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

Figure 9:
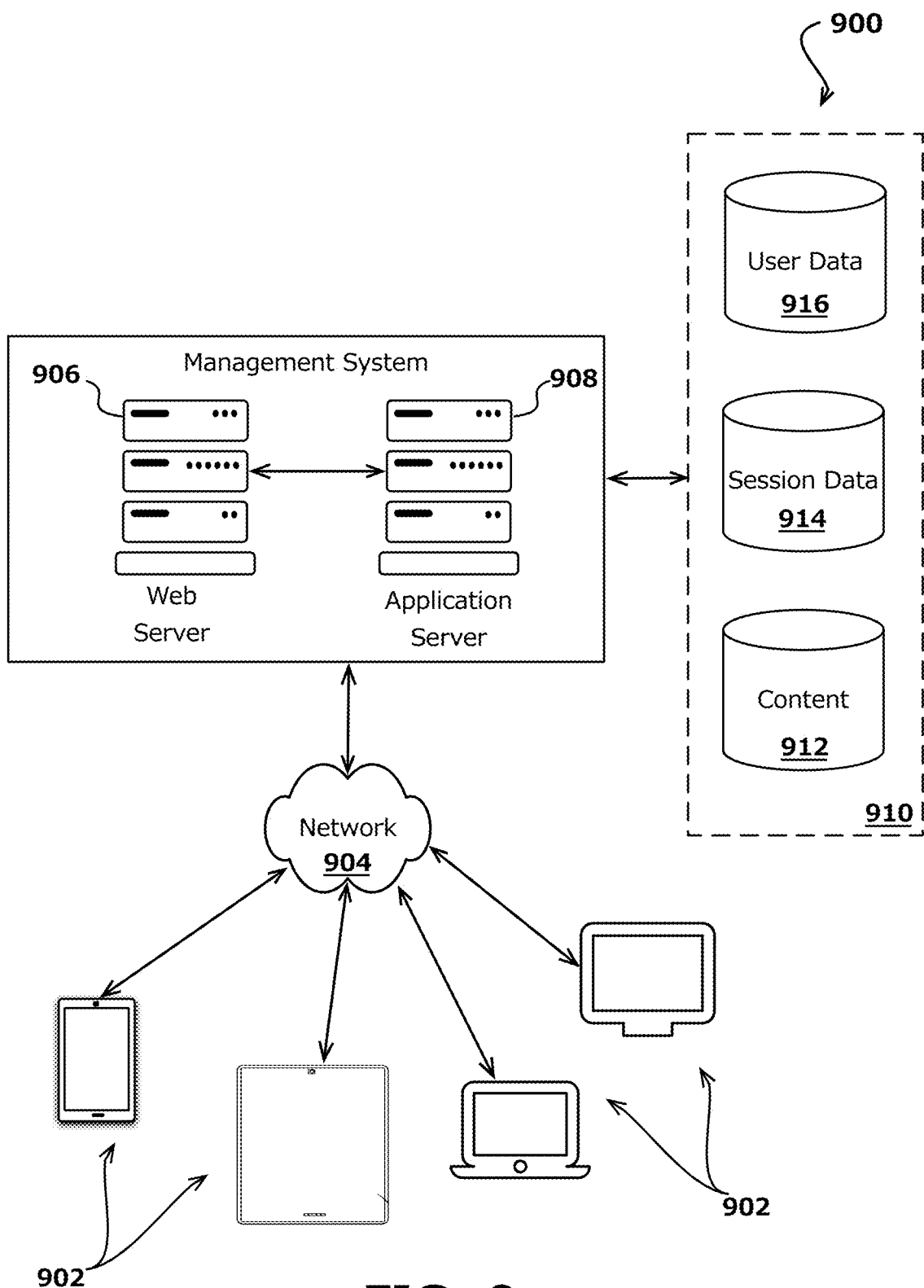
FIG. 9 illustrates an example of an environment for implementing aspects in accordance with various embodiments.

FIG. 9 illustrates an example of an environment 900 for implementing aspects in accordance with various embodiments. As will be appreciated, although a Web-based environment is used for purposes of explanation, different environments may be used, as appropriate, to implement various embodiments. The environment includes electronic client devices 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and can generate content such as text, graphics, audio and/or video to be transferred to the user, which may be served to the user by the Web server 906 in the form of HTML, XML, or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

An environment such as that illustrated in FIG. 9 can be useful for a provider such as a sponsored content provider or advertiser, who wishes to generate advertisements to be displayed by a provider or other content publisher, such as a search engine. A provider such as a social media website or electronic marketplace might also wish to advertise on other sites or with other providers.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
a computing device processor; and
a memory device including instructions that, when executed by the computing device processor, enables the computing system to:
obtain historical performance data during a first period of time from a plurality of electronic sponsored content providers, each electronic sponsored content provider offering sponsored content to a plurality of users across different electronic environments, the historical performance data associated with sponsored content campaigns for a consumption category,
segment the plurality of users across the different electronic environments organized into a plurality of target audience segments,
train an optimization model on the historical performance data to generate a trained optimization model for the consumption category, the trained optimization model operable to determine, for a sponsored content campaign associated with the consumption category, at least one allocation score quantifying an amount to commit to an electronic environment associated with a target audience, wherein the target audience is associated with one or more different electronic environments,
receive a content placement request during a second period of time from a sponsored content provider to initiate a sponsored content campaign, the content placement request including information for at least the consumption category, a commitment amount, and sponsored content elements, the second period of time occurring after the first period of time, a sponsored content element including information for at least one item for consumption associated with the consumption category,
determine a set of target audiences from the plurality of target audience segments across the different electronic environments based at least in part on the consumption category,
evaluate the trained optimization model on historical performance data for the set of target audiences to determine a set of allocation scores for the set of target audiences, each allocation score corresponding to one target audience of the set of target audiences,
generate a template for the consumption category that includes the sponsored content elements, the set of allocation scores, and the set of target audiences,
provide computer-readable instructions representative of the template to a content publisher to present the sponsored content elements and allocate portions of the commitment amount to providers of the different electronic environments associated with the set of target audiences based at least in part on the set of allocation scores,
update, based at least in part on performance data associated with the sponsored content campaign, the trained optimization model to generate an updated trained optimization model,
use the updated trained optimization model to generate updated allocation scores, and
allocate at least a portion of a remaining amount of the commitment amount based at least in part on the updated allocation scores.

2. The computing system of claim 1, wherein the instructions, when executed by the computing device processor further enables the computing system to:
receive a subsequent content placement request from a subsequent content provider for a subsequent sponsored content campaign, the subsequent content placement request associated with the consumption category, and
utilize the updated trained optimization model in the subsequent sponsored content campaign.

3. The computing system of claim 1, wherein the instructions, when executed by the computing device processor to update, based at least in part on the performance data associated with the sponsored content campaign, the trained optimization model, further enables the computing system to:
analyze the performance data to identify a plurality of conversion events, a conversion event associated with a conversion event type,
determine a total number of conversion events for individual conversion event types, and
normalize the total number of conversion events for individual conversion event types to a total number of conversion events for a reference conversion event type, the reference conversion event type being selected by the sponsored content provider, wherein a value of a normalized conversion event corresponds to a weight for the conversion event, the weight for the conversion event quantifying a level of importance of the conversion event in an advertising campaign.

4. The computing system of claim 3, wherein the instructions, when executed by the computing device processor to train the optimization model, further enables the computing system to:
for individual target audiences,
multiply individual conversion events by a corresponding weight to determine a set of conversion scores,
determine a summation of the set of conversion scores, and
divide the summation of the set of conversion scores by a total commitment amount to determine a performance parameter for the advertising campaign, individual total commitment values associated with a respective target audience, wherein the performance parameter quantifies a likelihood of a conversion event to occur.

5. The computing system of claim 1, wherein the instructions, when executed by the computing device processor further enables the computing system to:
use a ranking technique to generate a ranked set of content elements, individual content elements including information for the at least one item for consumption for use in an advertising campaign,
provide for display the ranked set of content elements, and
enable an advertiser to select at least one content element from the ranked set of content elements for use in the advertising campaign.

6. A computing system, comprising:
a computing device processor; and
a memory device including instructions that, when executed by the computing device processor, enables the computing system to:

obtain historical performance data during a first period of time from a plurality of electronic sponsored content providers, each electronic sponsored content provider offering sponsored content to a plurality of users across different electronic environments, the historical performance data associated with sponsored content campaigns for a consumption category, segment the plurality of users across the different electronic environments organized into a plurality of target audience segments, train an optimization model on the historical performance data to generate a trained optimization model for the consumption category, the trained optimization model operable to determine, for a sponsored content campaign associated with the consumption category, at least one allocation score quantifying an amount to commit to an electronic environment associated with a target audience, wherein the target audience is associated with one or more different electronic environments, receive a content placement request during a second period of time for a media campaign from a sponsored content provider, the content placement request including information for at least the consumption category, a commitment amount, and sponsored content elements, the second period of time occurring after the first period of time, a sponsored content element including information for at least one item for consumption associated with the consumption category, determine a set of target audiences from the plurality of target audience segments across the different electronic environments based at least in part on the consumption category, evaluate the trained optimization model on historical performance data for the set of target audiences to determine a set of allocation scores for the set of target audiences, each allocation score corresponding to one target audience of the set of target audiences, generate a template for the consumption category that includes the sponsored content elements, the set of allocation scores, and the set of target audiences, provide computer-readable instructions representative of the template to a content publisher to present the sponsored content elements and allocate portions of the commitment amount to providers of the different electronic environments associated with the set of target audiences based at least in part on the set of allocation scores, update, based at least in part on performance data associated with the media campaign, the trained optimization model to generate an updated trained optimization model, the updated trained optimization model configured to update the set of allocation scores, use the updated trained optimization model to generate updated allocation scores, and allocate at least a portion of a remaining amount of the commitment amount based at least in part on the updated allocation scores.

7. The computing system of claim 6, wherein the instructions, when executed by the computing device processor further enables the computing system to:

receive a subsequent content placement request from a subsequent sponsored content provider for a subsequent media campaign, the subsequent content placement request associated with the consumption category, and utilize the updated trained optimization model in the subsequent media campaign.

8. The computing system of claim 6, wherein a catalog of consumption categories includes the consumption category, the consumption category associated with one of a good or service.

9. The computing system of claim 6, wherein the instructions, when executed by the computing device processor, further enables the computing system to:

analyze the performance data to identify a plurality of conversion events, determine an estimate of a potential return on investment for a media campaign budget based at least in part on the plurality of conversion events, determine the estimate satisfies a threshold amount, and adjust the media campaign budget in accordance with the estimate.

10. The computing system of claim 6, wherein the instructions, when executed by the computing device processor to update, based at least in part on the performance data, further enables the computing system to:

analyze the performance data to identify a plurality of conversion events, determine an estimate of a return on investment for the media campaign based at least in part on the plurality of conversion events, determine the estimate fails to satisfy a threshold amount, and update the trained optimization model.

11. The computing system of claim 6, wherein the instructions, when executed by the computing device processor, further enables the computing system to:

monitor a value of at least one performance parameter during performance of the media campaign, determine whether the value satisfies a threshold value to a determined deviation, and automatically update the trained optimization model based at least in part on the value.

12. The computing system of claim 6, wherein a content publisher includes at least one social media network, and wherein the sponsored content provider includes at least one advertising entity.

13. The computing system of claim 6, wherein the instructions, when executed by the computing device processor, further enables the computing system to:

use at least one ranking technique to generate a ranked set of content elements, and enable an advertiser to select one of the ranked set of content elements for use in the media campaign.

14. The computing system of claim 6, wherein the instructions, when executed by the computing device processor, further enables the computing system to:

associate the media campaign with a first set of tags that characterize the media campaign;

identify a subsequent media campaign associated with a second set of tags that match the first set of tags by a threshold amount of deviation, and use information associated with the media campaign to set up the subsequent media campaign.

15. The computing system of claim 14, wherein the first set of tags identify one of the consumption category, the set of target audiences, or the performance data.

16. A computer-implemented method, comprising:
obtaining historical performance data during a first period of time from a plurality of electronic sponsored content providers, each electronic sponsored content provider offering sponsored content to a plurality of users across different electronic environments, the historical performance data associated with sponsored content campaigns for a consumption category;
segmenting the plurality of users across the different electronic environments organized into a plurality of target audience segments;
training an optimization model on the historical performance data to generate a trained optimization model for the consumption category, the trained optimization model operable to determine, for a sponsored content campaign associated with the consumption category, at least one allocation score quantifying an amount to commit to an electronic environment associated with a target audience, wherein the target audience is associated with one or more different electronic environments;
receiving a content placement request during a second period of time for a media campaign from a sponsored content provider, the content placement request including information for at least the consumption category, a commitment amount, and sponsored content elements, the second period of time occurring after the first period of time, a sponsored content element including information for at least one item for consumption associated with the consumption category;
determining a set of target audiences from the plurality of target audience segments across the different electronic environments based at least in part on the consumption category;
evaluating the trained optimization model on historical performance data for the set of target audiences to determine a set of allocation scores for the set of target audiences, each allocation score corresponding to one target audience of the set of target audiences;
generating a template for the consumption category that includes the sponsored content elements, the set of allocation scores, and the set of target audiences;
providing computer-readable instructions representative of the template to a content publisher to present the sponsored content elements and allocate portions of the commitment amount to providers of the different electronic environments associated with the set of target audiences based at least in part on the set of allocation scores;
updating, based at least in part on performance data associated with the media campaign, the trained optimization model to generate an updated trained optimization model, module, the updated trained optimization model configured to update the set of allocation scores;
using the updated trained optimization model to generate updated allocation scores; and
allocating at least a portion of a remaining amount of the commitment amount based at least in part on the updated allocation scores.

17. The computer-implemented method of claim 16, further comprising:
receiving a subsequent content placement request from a subsequent sponsored content provider for a subsequent media campaign, the subsequent content placement request associated with the consumption category, and
utilizing the updated trained optimization model in the subsequent media campaign.

18. The computer-implemented method of claim 16, wherein a catalog of consumption categories includes the consumption category, the consumption category associated with one of a good or service.

* * * * *